(12) United States Patent
Tauber et al.

(10) Patent No.: US 12,166,961 B2
(45) Date of Patent: Dec. 10, 2024

(54) VEHICULAR RADIOMETRIC CALIBRATION SYSTEMS AND METHODS

(71) Applicant: Teledyne FLIR Commercial Systems, Inc., Goleta, CA (US)

(72) Inventors: Sean Tauber, Goleta, CA (US); Michael D. Walters, San Jose, CA (US); Theodore R. Hoelter, Santa Barbara, CA (US); Nile E. Fairfield, Goleta, CA (US); Chris J. Posch, Santa Barbara, CA (US); Kelsey M. Judd, Goleta, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 143 days.

(21) Appl. No.: 17/858,896

(22) Filed: Jul. 6, 2022

(65) Prior Publication Data

US 2022/0337810 A1    Oct. 20, 2022

Related U.S. Application Data

(63) Continuation of application No. PCT/US2021/012554, filed on Jan. 7, 2021.
(Continued)

(51) Int. Cl.
*H04N 17/00* (2006.01)
*G01J 5/00* (2022.01)
(Continued)

(52) U.S. Cl.
CPC .............. *H04N 17/002* (2013.01); *G01J 5/70* (2022.01); *G06T 5/80* (2024.01); *G06V 20/58* (2022.01);
(Continued)

(58) Field of Classification Search
CPC .. H04N 17/002; G01J 5/70; G01J 2005/0077; G01J 5/0887; G01J 5/20; G01J 5/80;
(Continued)

(56) References Cited

U.S. PATENT DOCUMENTS 6,222,454 B1 *   4/2001  Harling ................... G01J 5/20
                                                     250/339.04
2015/0312488 A1 * 10/2015  Kostrzewa ............. H04N 23/11
                                                     348/164

(Continued)

FOREIGN PATENT DOCUMENTS

DE         102012112412 A1    6/2015

*Primary Examiner* — Shahbaz Nazrul
(74) *Attorney, Agent, or Firm* — Haynes and Boone, LLP

(57) ABSTRACT

Techniques are disclosed for providing vehicular radiometric calibration systems and methods. In one example, a method includes capturing, by an array of infrared sensors mounted on a vehicle, a thermal image of a scene during navigation of the vehicle and/or while the vehicle is stationary. The thermal image comprises a plurality of pixel values. Each infrared sensor of the array is associated with a respective one of the plurality of pixel values. The method further includes determining temperature data associated with a portion of the scene, where the portion is associated with a subset of the plurality of pixel values. The method further includes generating a correction value based on the thermal image and the temperature data. Related systems, vehicles, and devices are also provided.

20 Claims, 11 Drawing Sheets

Related U.S. Application Data

(60) Provisional application No. 62/959,602, filed on Jan. 10, 2020.

(51) Int. Cl.
  *G01J 5/70* (2022.01)
  *G06T 5/80* (2024.01)
  *G06V 20/58* (2022.01)

(52) U.S. Cl.
  CPC .............. *G01J 2005/0077* (2013.01); *G06T 2207/10048* (2013.01); *G06T 2207/30252* (2013.01)

(58) Field of Classification Search
  CPC .. G01J 5/026; G06T 5/80; G06T 2207/10048; G06T 2207/30252; G06V 20/58; B60R 1/00; B60R 2300/402
  See application file for complete search history.

(56) References Cited

U.S. PATENT DOCUMENTS

| | | | |
|---|---|---|---|
| 2016/0299009 A1* | 10/2016 | Jeon | G01J 5/0025 |
| 2018/0238740 A1* | 8/2018 | Christel | G01J 5/53 |
| 2018/0283953 A1 | 10/2018 | Frank et al. | |
| 2019/0221004 A1* | 7/2019 | Tokita | G01J 5/0025 |

* cited by examiner

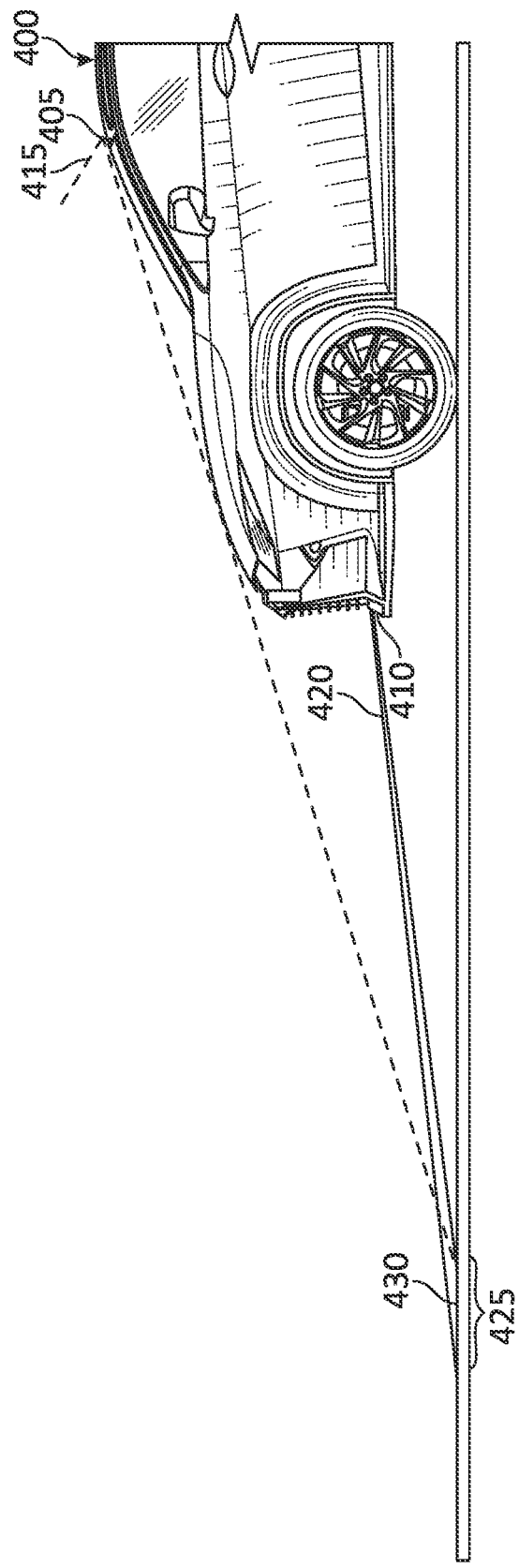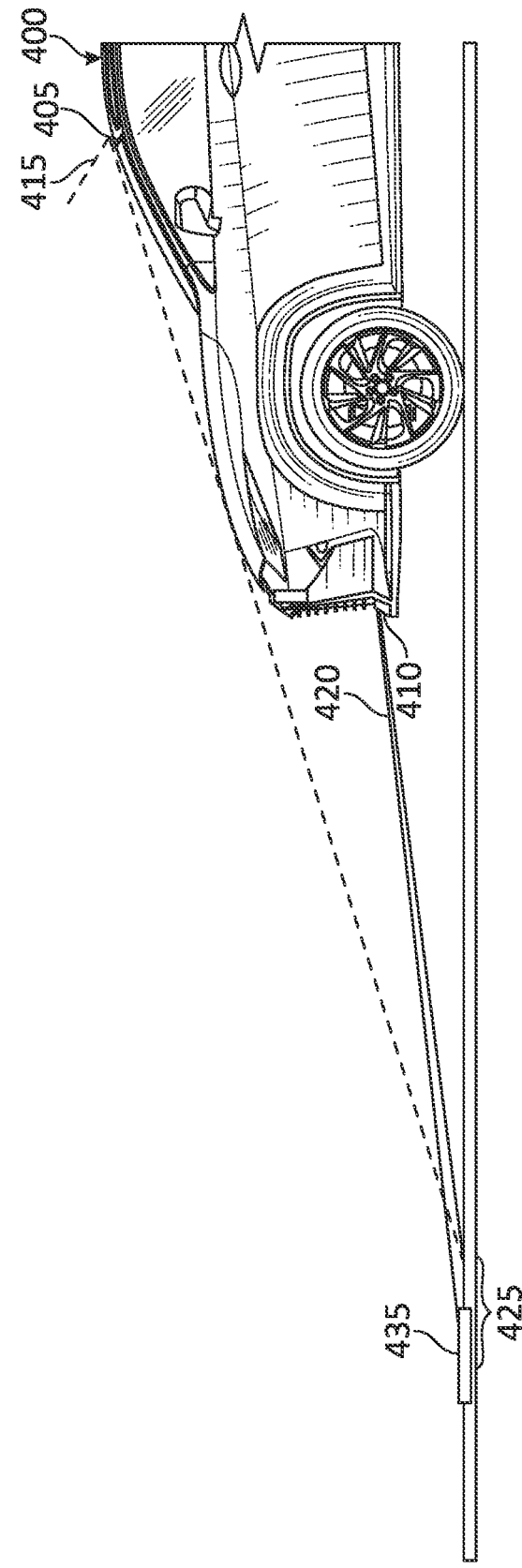

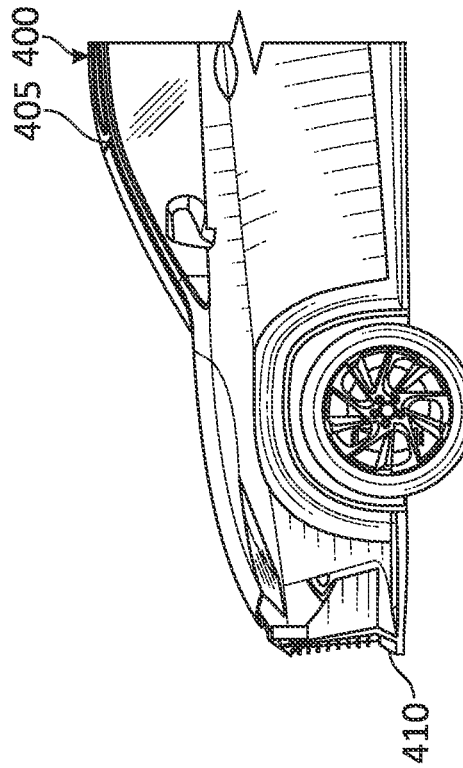
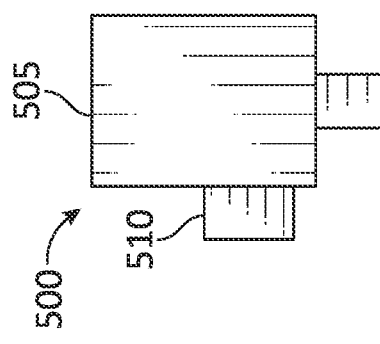
FIG. 5
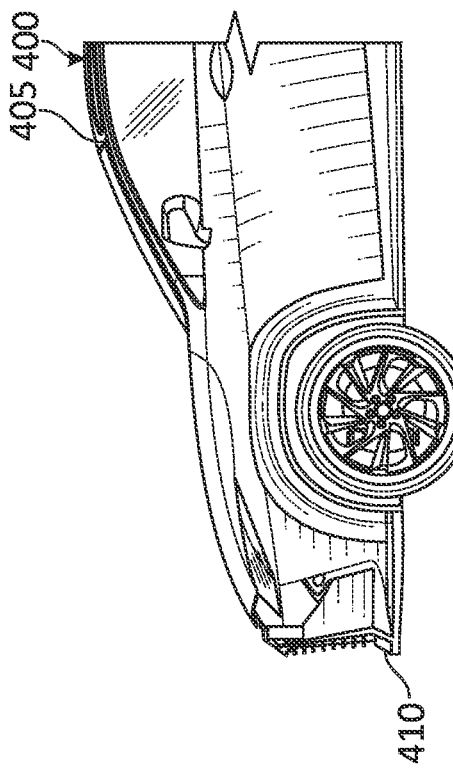
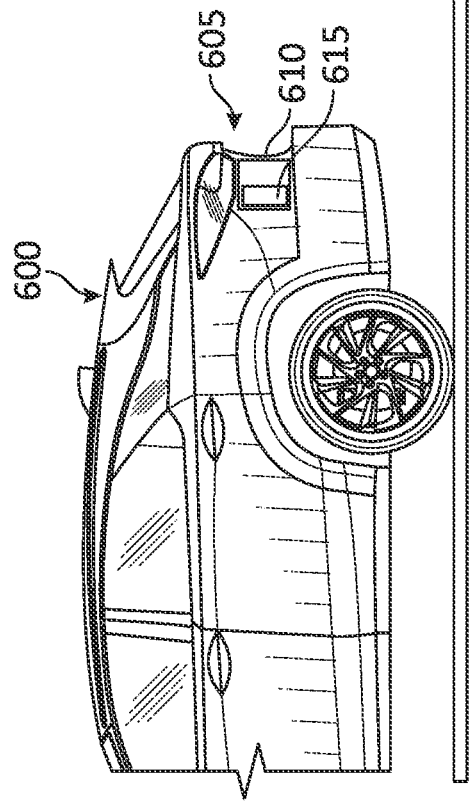
FIG. 6

VEHICULAR RADIOMETRIC CALIBRATION SYSTEMS AND METHODS

CROSS-REFERENCE TO RELATED APPLICATIONS

This application is a continuation of International Patent Application No. PCT/US2021/012554 filed Jan. 7, 2021 and entitled "RADIOMETRIC CALIBRATION SYSTEMS FOR INFRARED IMAGERS," which claims priority to and the benefit of U.S. Provisional Patent Application No. 62/959,602 filed Jan. 10, 2020 and entitled "VEHICULAR RADIOMETRIC CALIBRATION SYSTEMS AND METHODS," all of which are hereby incorporated by reference in their entirety.

TECHNICAL FIELD

One or more embodiments relate generally to thermal imaging and more particularly, for example, to vehicular radiometric calibration systems and methods.

BACKGROUND

Imaging systems may include an array of detectors, with each detector functioning as a pixel to produce a portion of a two-dimensional image. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, a method includes capturing, by an array of infrared sensors mounted on a vehicle, a thermal image of a scene during navigation of the vehicle and/or while the vehicle is stationary. The thermal image includes a plurality of pixel values. Each infrared sensor of the array is associated with a respective one of the plurality of pixel values. The method further includes determining temperature data associated with a portion of the scene, where the portion is associated with a subset of the plurality of pixel values. The method further includes generating a correction value based on the thermal image and the temperature data.

In one or more embodiments, a vehicle includes an array of infrared sensors configured to capture a thermal image of a scene during navigation of the vehicle and/or while the vehicle is stationary. The thermal image includes a plurality of pixel values. Each infrared sensor of the array is associated with a respective one of the plurality of pixel values. The vehicle further includes a processing circuit configured to generate a correction value based on the thermal image and temperature data associated with a portion of the scene, where the portion is associated with a subset of the plurality of pixel values.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 4A, 4B, 5, and 6 illustrate examples of scene capture for facilitating calibration of an infrared camera of a vehicle in accordance with one or more embodiments of the present disclosure.

Figure 1:
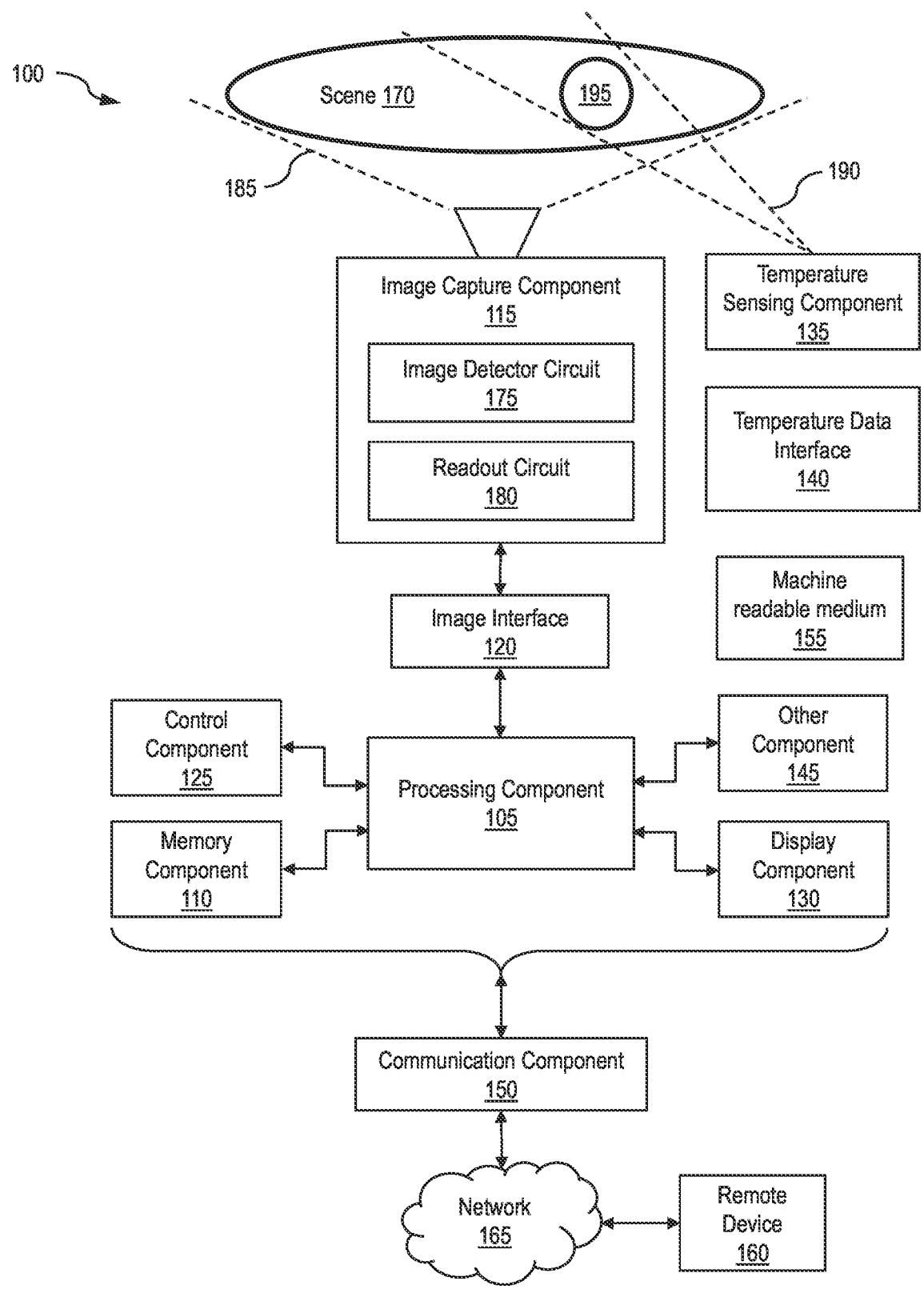
FIG. 1 illustrates a block diagram of an example imaging system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various embodiments for radiometric calibration systems and methods are provided herein. Temperature/radiometric accuracy of an infrared imaging device may be determined using a reference (e.g., also referred to as a reference object or reference target) in a scene having a known temperature. In an aspect, temperature/radiometric accuracy may refer to how accurately pixel values captured by an infrared imaging device correlate with actual scene temperatures. In an aspect, the infrared image is a thermal image and the infrared imaging device is a thermal imaging device. A reference may be provided by a blackbody target (e.g., also referred to as a blackbody object). For example, an object providing a uniform blackbody of a known temperature may be captured by the infrared imaging system in a thermal image to calibrate the infrared imaging device. In an aspect, an object or a target may be three-dimensional or two-dimensional (e.g., a surface). As non-limiting examples, the reference may be a road (e.g., asphalt), a blackbody road marker placed along a route, a high emissive surface mounted on a building or a vehicle, and/or others.

In various embodiments, radiometric calibration (e.g., also referred to simply as calibration) of an infrared imaging device may be based on an infrared image, captured by the infrared imaging device, that includes a reference (e.g., a blackbody target) and temperature data associated with the reference (e.g., a temperature of the blackbody target). The temperature data associated with the reference may be determined using a temperature sensor. In some cases, the temperature data may include an actual (e.g., not relative) temperature of the reference. In some aspects, the infrared imaging device and the temperature sensor may be mounted to a land-based vehicle (e.g., also referred to as a terrestrial vehicle). In other aspects, the temperature sensor may be remote from the land-based vehicle and provide the temperature data to the land-based vehicle to facilitate calibration of the land-based vehicle's infrared imaging device. Vehicles may be manned vehicles (e.g., including self-driving vehicles), unmanned vehicles (e.g., unmanned cars, unmanned aerial vehicles (UAVs)), or varying degrees thereof (e.g., unmanned drive functionality while providing ways to effectuate manual take-over).

An infrared imaging device may include an array of infrared sensors. Radiometric calibration may be performed to ensure pixel values captured by the infrared sensors can be properly correlated to temperatures of an imaged scene. In an embodiment, radiometric calibration of the infrared sensors may be performed at the factory during the time of manufacture of the infrared sensors to determine calibration data to accurately correlate pixel counts with actual scene temperatures such that captured images are radiometrically calibrated. After leaving the factory and during use in the field, the infrared sensors may be recalibrated. Radiometric recalibration of the infrared sensors may be performed to mitigate variations in performance of the infrared sensors over time (e.g., ranging from seconds to months) that, if left uncorrected, can lead to errors in radiometric accuracy. Recalibration may be performed continuously, substantially continuously, periodically, upon user request, and/or at other intervals.

Radiometric calibration of the infrared sensors may be performed to determine one or more correction values (e.g., also referred to as correction terms, compensation values, or compensation terms) to be applied to pixel values of captured infrared images to obtain temperature radiometrically calibrated infrared images (e.g., also referred to as temperature compensated infrared images). In some aspects, the infrared imaging device may capture images of one or more uniform blackbody targets having a known temperature. One or more correction values may be determined for each infrared sensor of the infrared imaging device. In some cases, different correction values may be associated with different temperature ranges to account for variations in performance over a range of temperatures.

The correction values may include offset values (e.g., correction values that are arithmetically added to or subtracted from pixel values provided by the infrared sensors) and/or gain values (e.g., correction values that are multiplied with pixel values provided by the infrared sensors). Updated correction values may be obtained by performing recalibration of the infrared imaging device. In some aspects, to apply correction values to pixel values of an infrared image, the pixel values of the infrared image may be processed (e.g., filtered) using a filter (e.g., infinite impulse response (IIR) filter) that provides a weighted/moving average of an updated correction value(s) and an old correction value(s). In some cases, the reference can be captured by a subset of the infrared sensors, one or more correction values determined based on pixel values from the subset of the infrared sensors, and these correction terms applied to pixel values of the entire array of infrared sensors (e.g., not just applied to pixel values captured by the subset of the infrared sensors). In these cases, the infrared sensors of the infrared imaging device have characteristics, such as array uniformity, to allow correction values determined based on image data of a reference(s) captured by certain sensors to be propagated to other sensors (e.g., sensors that did not capture image data of a reference(s)).

In some embodiments, a confidence factor in radiometric accuracy may be determined. In an aspect, machine learning techniques may be leveraged to refine the radiometric accuracy. In some cases, the confidence factor may be indicative of a confidence pertaining to temperature determination, object recognition, and/or other determinations by an imaging system based on captured images (e.g., thermal images). For example, the thermal images, temperature determinations, object recognition decisions, and/or other determinations may facilitate automated driving applications, such as for automated emergency braking and/or full autonomy vehicle.

Using various embodiments, infrared devices, such as thermal camera cores, with precise and accurate radiometry in automotive applications are provided. A radiometric output with high precision allows relative differences in temperature to be obtained with high fidelity. In some cases, improved temperature/radiometric accuracy can be used to more precisely identify local variations in temperature, particularly where absolute temperature values, rather than relative temperature values are desired. In some cases, improved temperature/radiometric accuracy may facilitate object recognition applications, automotive applications (e.g., automated emergency braking, autonomous driving, etc.), and/or generally any applications in which accuracy of infrared images (e.g., thermal images) are desired.

Although various embodiments facilitate calibration of infrared imaging devices coupled (e.g., mounted) to land-based vehicles, the various embodiments may apply to other types of vehicles (e.g., aerial-based vehicles, naval-based vehicles) as well as non-vehicular applications. As one example, a user may point a non-mounted or non-mountable imaging system including an infrared camera and a temperature sensor on a road, a blackbody road marker, and/or other blackbody target to capture thermal images and temperature data of these blackbody targets to facilitate calibration. As another example, a surveillance camera may include an infrared camera and a temperature sensor pointed downward to capture a scene that typically includes a high emissivity surface (e.g., asphalt surface). As other examples, an infrared camera and/or a temperature sensor may be mounted to an aerial vehicle (e.g., unmanned aerial vehicle) and/or a naval vehicle to capture images and/or temperature data of ground-based references and/or non-ground-based references (e.g., a blackbody target provided by a blimp or other aerial device and/or a blackbody target provided by a ship).

Referring now to the drawings, FIG. 1 illustrates a block diagram of an example imaging system 100 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of EM radiation and provides representative data (e.g., one or more still image frames or video image frames). In some embodiments, the imaging system 100 may include a housing that at least partially encloses one or more components of the imaging system 100, such as to facilitate compactness and protection of the imaging system 100. For example, the solid box labeled 100 in FIG. 1 may represent the housing of the imaging system 100. The housing may contain more, fewer, and/or different components of the imaging system 100 than those depicted within the solid box in FIG. 1. In other embodiments, one or more components of the imaging system 100 may be implemented remotely from each other in a distributed fashion (e.g., networked or otherwise). In an embodiment, the imaging system 100 (or components thereof) may include a portable device and may be incorporated (e.g., mounted), for example, into a land-based vehicle. By way of non-limiting examples, the vehicle may be a land-based vehicle (e.g., automobile, truck, etc.), a naval-based vehicle, an aerial vehicle (e.g., manned aerial vehicle, UAV), a space vehicle, or generally any type of vehicle that may incorporate (e.g., installed within, mounted thereon, etc.) the imaging system 100.

The imaging system 100 includes, according to one implementation, a processing component 105, a memory component 110, an image capture component 115, an image interface 120, a control component 125, a display component 130, a temperature sensing component 135, a temperature data interface 140, other component 145, and/or a communication component 150. The processing component 105, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The processing component 105 may be configured to interface and communicate with the various other components (e.g., 110, 115, 120, 125, 130, 135, 145, etc.) of the imaging system 100 to perform such operations. For example, the processing component 105 may be configured to process captured image data received from the image capture component 115, store the image data in the memory component 110, and/or retrieve stored image data from the memory component 110. In one aspect, the processing component 105 may be configured to perform various system control operations (e.g., to control communications and operations of various components of the imaging system 100) and other image processing operations (e.g., data conversion, video analytics, etc.).

In some embodiments, the processing component 105 may perform operations to facilitate calibration of the image capture component 115 (e.g., sensors of the image capture component 115). In one case, the processing component 105 may generate calibration data (e.g., one or more correction values) based on an image of a scene 170 from the image capture component 115 and temperature data of at least a portion of the scene 170 from the temperature sensing component 135, and/or apply the calibration data to the image (e.g., pixel values of the image) captured by the image capture component 115. For example, the processing component 105 may apply local and/or global correction values to various pixel values such that they are radiometrically calibrated with the temperature data detected by the temperature sensing component 135. In an aspect, a result of an infrared image (e.g., a thermal image) to which correction values are applied may be referred to as a temperature corrected infrared image, temperature compensated infrared image, corrected infrared image, or compensated infrared image. In some cases, the processing component 105 may perform operations such as non-uniformity correction (NUC) (e.g., flat field correction (FFC) or other calibration technique), spatial and/or temporal filtering, and/or radiometric conversion on the pixel values.

The memory component 110 includes, in one embodiment, one or more memory devices configured to store data and information, including infrared image data and information. The memory component 110 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processing component 105 may be configured to execute software instructions stored in the memory component 110 so as to perform method and process steps and/or operations. The processing component 105 and/or the image interface 120 may be configured to store in the memory component 110 images or digital image data captured by the image capture component 115 and/or correction values (e.g., determined from calibration). The processing component 105 may be configured to store processed still and/or video images in the memory component 110.

In some embodiments, a separate machine-readable medium 155 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 155 may be portable and/or located separate from the imaging system 100, with the stored software instructions and/or data provided to the imaging system 100 by coupling the machine-readable medium 155 to the imaging system 100 and/or by the imaging system 100 downloading (e.g., via a wired link and/or a wireless link) from the machine-readable medium 155. It should be appreciated that various modules may be integrated in software and/or hardware as part of the processing component 105, with code (e.g., software or configuration data) for the modules stored, for example, in the memory component 110.

The imaging system 100 may represent an imaging device, such as a video and/or still camera, to capture and process images and/or videos of the scene 170. In this regard, the image capture component 115 of the imaging system 100 may be configured to capture images (e.g., still and/or video images) of the scene 170 in a particular spectrum or modality. The image capture component 115 has a field of view (FOV) 185. In an embodiment, the image capture component 115 is mounted on a vehicle to capture images (e.g., thermal images) of the scene 170. The image capture component 115 includes an image detector circuit 175 (e.g., a thermal infrared detector circuit) and a readout circuit 180 (e.g., an ROIC). For example, the image capture component 115 may include an IR imaging sensor (e.g., IR imaging sensor array) configured to detect IR radiation in the near, middle, and/or far IR spectrum and provide IR images (e.g., IR image data or signal) representative of the IR radiation from the scene 170. For example, the image detector circuit 175 may capture (e.g., detect, sense) IR radiation with wavelengths in the range from around 700 nm to around 2 mm, or portion thereof. For example, in some aspects, the image detector circuit 175 may be sensitive to (e.g., better detect) short-wave IR (SWIR) radiation, mid-wave IR (MWIR) radiation (e.g., EM radiation with wavelength of 2-5 µm) and/or long-wave IR (LWIR) radiation (e.g., EM radiation with wavelength of 7-14 µm), or any desired IR wavelengths (e.g., generally in the 0.7 to 14 µm range). In other aspects, the image detector circuit 175 may capture radiation from one or more other wavebands of the EM spectrum, such as visible-light, ultraviolet light, and so forth.

The image detector circuit 175 may capture image data associated with the scene 170. To capture the image, the image detector circuit 175 may detect image data of the scene 170 (e.g., in the form of EM radiation) and generate pixel values of the image based on the scene 170. An image may be referred to as a frame or an image frame. In some cases, the image detector circuit 175 may include an array of detectors (e.g., also referred to as an array of sensors or an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns.

The image may be, or may be considered, a data structure that includes pixels and is a representation of the image data associated with the scene 170, with each pixel having a pixel value that represents EM radiation emitted and/or reflected from a portion of the scene and received by a detector that generates the pixel value. Based on context, a pixel may refer to a detector of the image detector circuit 175 that generates an associated pixel value or a pixel (e.g., pixel location, pixel coordinate) of the image formed from the generated pixel values.

In an aspect, the pixel values generated by the image detector circuit 175 may be represented in terms of digital count values generated based on the electrical signals obtained from converting the detected radiation. For example, in a case that the image detector circuit 175 includes or is otherwise coupled to an analog-to-digital converter (ADC) circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 175 (e.g., an IR image detector circuit) is associated with higher digital count values and higher temperatures.

The readout circuit 180 may be utilized as an interface between the image detector circuit 175 that detects the image data and the processing component 105 that processes the detected image data as read out by the readout circuit 180, with communication of data from the readout circuit 180 to the processing component 105 facilitated by the image interface 120. An image capturing frame rate may refer to the rate (e.g., images per second) at which images are detected in a sequence by the image detector circuit 175 and provided to the processing component 105 by the readout circuit 180. The readout circuit 180 may read out the pixel values generated by the image detector circuit 175 in accordance with an integration time (e.g., also referred to as an integration period).

In various embodiments, a combination of the image detector circuit 175 and the readout circuit 180 may be, may include, or may together provide an FPA. In some aspects, the image detector circuit 175 may be a thermal image detector circuit that includes an array of microbolometers, and the combination of the image detector circuit 175 and the readout circuit 180 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the image capture component 115 may include one or more filters adapted to pass radiation of some wavelengths but substantially block radiation of other wavelengths. For example, the image capture component 115 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the image capture component 115 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 115 may include an IR imaging sensor having an FPA of detectors responsive to IR radiation including near infrared (NIR), SWIR, MWIR, LWIR, and/or very-long wave IR (VLWIR) radiation. In some other embodiments, alternatively or in addition, the image capture component 115 may include a complementary metal oxide semiconductor (CMOS) sensor or a charge-coupled device (CCD) sensor that can be found in any consumer camera (e.g., visible light camera).

Other imaging sensors that may be embodied in the image capture component 115 include a photonic mixer device (PMD) imaging sensor or other time of flight (ToF) imaging sensor, light detection and ranging (LIDAR) imaging device, millimeter imaging device, positron emission tomography (PET) scanner, single photon emission computed tomography (SPECT) scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 115 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 120 may include, in some embodiments, appropriate input ports, connectors, switches, and/or circuitry configured to interface with external devices (e.g., a remote device 160 and/or other devices) to receive images (e.g., digital image data) generated by or otherwise stored at the external devices. The received images or image data may be provided to the processing component 105. In this regard, the received images or image data may be converted into signals or data suitable for processing by the processing component 105. For example, in one embodiment, the image interface 120 may be configured to receive analog video data and convert it into suitable digital data to be provided to the processing component 105.

In some embodiments, the image interface 120 may include various standard video ports, which may be connected to a video player, a video camera, or other devices capable of generating standard video signals, and may convert the received video signals into digital video/image data suitable for processing by the processing component 105. In some embodiments, the image interface 120 may also be configured to interface with and receive images (e.g., image data) from the image capture component 115. In other embodiments, the image capture component 115 may interface directly with the processing component 105.

The temperature sensing component 135 has an FOV 190 and receives radiation from a portion of the scene 170. The temperature sensing component 135 may include one or more temperature sensors. In some cases, a temperature sensor may be a non-contact temperature sensor, such as a thermopile, pyrometer, thermocouple, and/or other appropriate sensor providing spot metering. In an embodiment, as shown in FIG. 1, at least a portion of the FOV 190 of the temperature sensing component 135 overlaps the FOV 185 of the imaging capture component 115. In this regard, the temperature sensing component 135 may be utilized to provide temperature data (e.g., one or more measured temperature values) associated with the portion of the scene 170.

In an embodiment, the temperature sensing component 135 may provide temperature data associated with an object 195 in the scene 170. The object 195 may include a portion of a road (e.g., asphalt), a road marker (e.g., a blackbody road marker), and/or generally any object whose temperature data can be used to facilitate calibration. In this regard, a subset of pixels values captured by the image capture component 115 correspond with temperature data captured by the temperature sensing component 135. The subset of the pixels and associated temperature data may be used to calibrate the imaging system 100 (e.g., detectors of the image detector circuit 175). In some embodiments, the processing component 105 may use the temperature data from the temperature sensing component 135 and the captured images (e.g., thermal images) from the image capture component 115 to determine calibration data (e.g., one or more correction values) to be applied to the pixel values of the captured images to provide reliable radiometrically calibrated images.

The temperature data captured by the temperature sensing component 135 may be provided to the processing component 105 through the temperature data interface 140. The temperature data interface 140 may receive the temperature data and convert the temperature data to a format appropriate for the processing component 105. In some embodiments, the temperature data interface 120 may be configured to interface with and receive temperature data from the temperature sensing component 135 and provide the temperature data to the processing component 105. In other embodiments, the image capture component 115 may interface directly with the processing component 105 (e.g., the temperature data interface 140 is optional).

In some aspects, the imaging system 100 does not include the temperature sensing component 135 and/or the temperature data interface 140. In one case, temperature data for a reference may be provided to (e.g., rather than measured by) the imaging system. For example, the temperature data may be provided to the imaging system 100 (e.g., via the temperature data interface 140 and/or directly to another component of the imaging system 100).

In some embodiments, as shown in FIG. 1, the object 195 appropriate for facilitating calibration of the image capture component 115 may fall within the FOV 185 of the image capture component 115 and the FOV 190 of the temperature sensing component 135. The object 195 may be used as a temperature reference to facilitate calibration. In one case, the object 195 may be considered to provide a uniform blackbody or a substantially uniform blackbody. In another case, the object 195 may have and/or may be coupled to a communication device (e.g., an antenna) to communicate temperature data (e.g., a temperature in Celsius) associated with the object 195. As non-limiting examples, the object 195 may be made from various materials such as, for example, polymers, glass, aluminum (e.g., painted or anodized), or other materials. Examples of objects for facilitating calibration of the imaging system 100 (e.g., the imaging capture component 115) are described with respect to FIGS. 4A and 5-12.

Although in FIG. 1 the FOV 190 of the temperature sensing component 135 is narrower than the FOV 185 of the image capture component 115, the FOV 190 of the temperature sensing component 135 may be wider than the FOV 185 of the image capture component 115. Further in this regard, although in FIG. 1 the FOV 190 of the temperature sensing component 135 is at an angle relative to the FOV 185 of the image capture component 115, the FOVs 185 and/or 190 may be different from that shown in FIG. 1 with appropriate positioning and pointing of a sensor(s) of the temperature sensing component 135 and/or a sensor(s) of the image capture component 115. For example, the temperature sensing component 135 (e.g., a sensor(s) of the temperature sensing component 135) may be substantially collocated with the image capture component 115 (e.g., a sensor(s) of the imaging capture component 115) such that a center of the FOVs 185 and 190 may substantially be at the same position.

The control component 125 includes, in one embodiment, a user input and/or an interface device, such as a rotatable knob (e.g., potentiometer), push buttons, slide bar, keyboard, and/or other devices, that is adapted to generate a user input control signal. The processing component 105 may be configured to sense control input signals from a user via the control component 125 and respond to any sensed control input signals received therefrom. The processing component 105 may be configured to interpret such a control input signal as a value, as generally understood by one skilled in the art. In one embodiment, the control component 125 may include a control unit (e.g., a wired or wireless handheld control unit) having push buttons adapted to interface with a user and receive user input control values. In one implementation, the push buttons of the control unit may be used to control various functions of the imaging system 100, such as autofocus, menu enable and selection, field of view, brightness, contrast, noise filtering, image enhancement, and/or various other features of an imaging system or camera.

The display component 130 includes, in one embodiment, an image display device (e.g., a liquid crystal display (LCD)) or various other types of generally known video displays or monitors. The processing component 105 may be configured to display image data and/or temperature data on the display component 130. The processing component 105 may be configured to retrieve image data and/or temperature data from the memory component 110 and display any retrieved image data and/or temperature data on the display component 130. The display component 130 may include display circuitry, which may be utilized by the processing component 105 to display image data and/or temperature data. The display component 130 may be adapted to receive data directly from the image capture component 115, processing component 105, image interface 120, temperature sensing component 135, and/or temperature data interface 140, or the image data and/or temperature data may be transferred from the memory component 110 via the processing component 105.

The other component 145 includes, in one embodiment, one or more sensors of various types, depending on the application or implementation requirements, as would be understood by one skilled in the art. Sensors of the other component 145 provide data and/or information to at least the processing component 105. In one aspect, the other component 145 may include a global positioning system (GPS). In one aspect, the processing component 105 may be configured to communicate with the other component 145. In various implementations, the other component 145 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The other component 145 may represent conventional sensors as generally known by one skilled in the art for monitoring various conditions (e.g., environmental conditions) that may have an effect (e.g., on the image appearance) on the image data provided by the image capture component 115 and/or the temperature data provided by the temperature sensing component 135.

In some implementations, the other component 145 (e.g., one or more sensors) may include devices that relay information to the processing component 105 via wired and/or wireless communication. For example, the other component 145 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 105 can use the information (e.g., sensing data) retrieved from the other component 145 to modify a configuration of the image capture component 115 (e.g., adjusting a light sensitivity level, adjusting a direction or angle of the image capture component 115, adjusting an aperture, etc.).

The communication component 150 may be configured to facilitate wired and/or wireless communication over a network 165. By of non-limiting examples, the communication component 150 may include an Ethernet connection, a wireless local area network (WLAN) component based on the IEEE 802.11 standards, a wireless broadband component, a network interface component (NICK), a mobile cellular component, a wireless satellite component, Of various other types of communication components including radio frequency (RF), microwave frequency (MWF), and/or infrared frequency (IRF) components configured for communication with the network 165. In one ease, the communication component 150 may include an antenna coupled thereto for wireless communication purposes. In one case, the communication component 150 may be configured to interface with a Digital Subscribed Line (DSL) modem, a Public Switched Telephone Network (PSTN) modem, an Ethernet device, and/or various other types of wired and/or wireless network communication devices configured for communication with the network 165. In some cases, the communication component 150 may facilitate communication of the imaging system 100 with the network 165 and/or other networks.

The network 165 may be implemented as a single network or a combination of multiple networks. For example, in various embodiments, the network 165 may include the Internet and/or one or more intranets, landline networks, wireless-networks, and/or other appropriate types of communciation networks (e.g., cellular phone network) configured to communicate with other communication networks, such as the Internet. As such, in various embodiments, the imaging system 100 and/or its individual associated components may be associated with a particular network link such as for ex ample a Uniform Resource Locator (URL), an Internet Protocol (IP) address, and/or a mobile phone number.

In some embodiments, various components of the imaging system 100 may be distributed and in communication with one another over the network 165. The communication component 150 may be configured to facilitate wired and/or wireless communication among various components of the imaging system 100 over the network 165. In such embodiments, components may also be replicated if desired for particular applications of the imaging system 100. That is, components configured for same or similar operations may be distributed over a network. Further, all or part of any one of the various components may be implemented using appropriate components of the remote device 160 (e.g., a conventional digital video recorder (DVR), a computer configured for image processing, and/or other device) in communication with various components of the imaging system 100 via the communication component 150 over the network 165, if desired. Thus, for example, all or part of the processing component 105, all or part of the memory component 110, all or part of the display component 130, and/or all or part of the temperature sensing component 135 may be implemented or replicated at the remote device 160. In some embodiments, the imaging system 100 may not include imaging sensors (e.g., image capture component 115), but instead receive images or image data from imaging sensors located separately and remotely from the processing component 105 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the processing component 105 may be combined with the memory component 110, image capture component 115, image interface 120, display component 130, temperature sensing component 135, temperature data interface 140, other component 145, and/or communication component 150. In another example, the processing component 105 may be combined with the image capture component 115, such that certain functions of processing component 105 are performed by circuitry (e.g., a processor, a microprocessor, a logic device, a microcontroller, etc.) within the image capture component 115.

Figure 2:
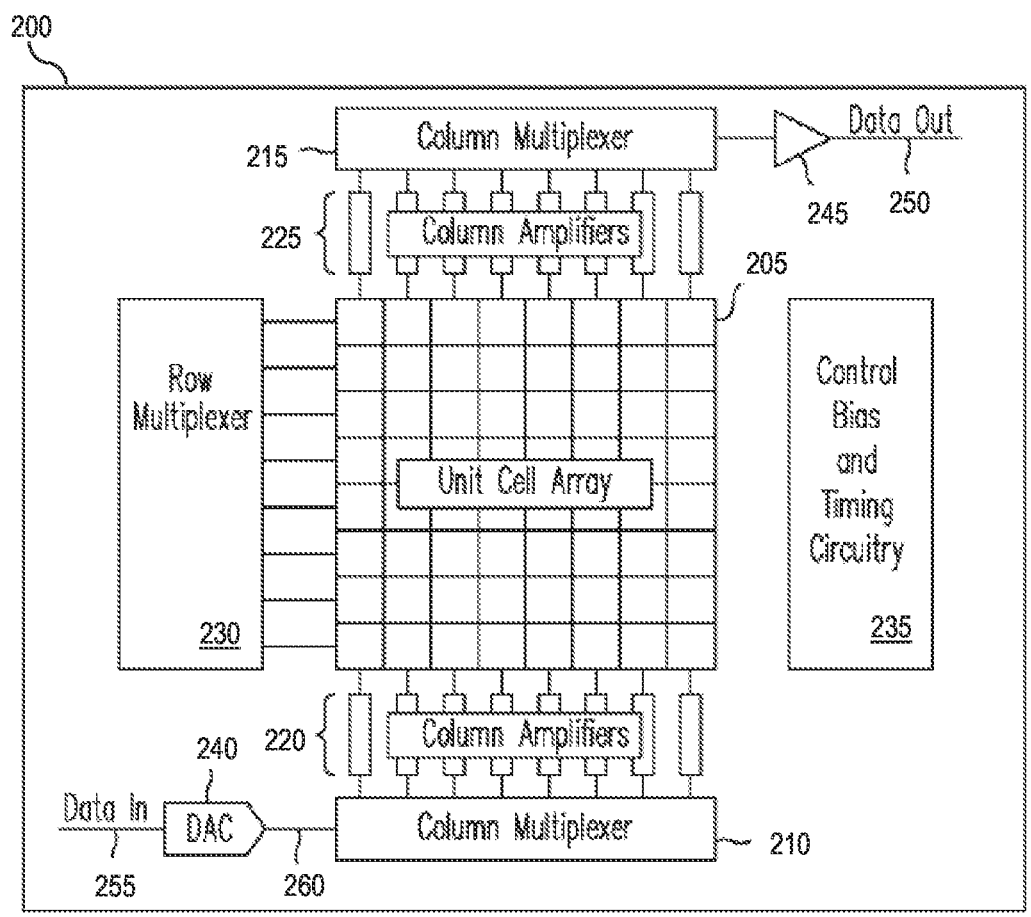
FIG. 2 illustrates a block diagram of an example image sensor assembly in accordance with one or more embodiments of the present disclosure.

FIG. 2 illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be an FPA, for example, implemented as the image capture component 115 of FIG. 1.

The image sensor assembly 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. The unit cell array 205 includes an array of unit cells. In an aspect, each unit cell may include a detector and interface circuitry. The interface circuitry of each unit cell may provide an output signal, such as an output voltage or an output current, in response to a detector signal (e.g., detector current, detector voltage) provided by the detector of the unit cell. The output signal may be indicative of the magnitude of EM radiation received by the detector. The column multiplexer 215, column amplifiers 220, row multiplexer 230, and data output buffer 245 may be used to provide the output signals from the unit cell array 205 as a data output signal on a data output line 250. The output signals on the data output line 250 may be provided to components downstream of the image sensor assembly 200, such as processing circuitry (e.g., the processing component 105 of FIG. 1), memory (e.g., the memory component 110 of FIG. 1), display device (e.g., the display component 130 of FIG. 1), and/or other component to facilitate processing, storage, and/or display of the output signals. The data output signal may be an image formed of the pixel values for the image sensor assembly 200. In this regard, the column multiplexer 215, the column amplifiers 220, the row multiplexer 230, and the data output buffer 245 may collectively provide an ROIC (or portion thereof) of the image sensor assembly 200. In an embodiment, components of the image sensor assembly 200 may be implemented such that the unit cell array 205 is hybridized to (e.g., bonded to, joined to, mated to) the ROIC.

The column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array 205 traverses to get to the column multiplexer 215. As another example, the column amplifiers 225 may include an ADC for converting analog signals to digital signals (e.g., to obtain digital count values). These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., IR light) incident on the detectors of the unit cells.

The control bias and timing circuitry 235 may generate bias values, timing control voltages, and switch control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the processing component 105 and/or imaging capture component 115 of FIG. 1.

In an embodiment, the image sensor assembly 200 may be implemented as part of an imaging system (e.g., the imaging system 100). In addition to the various components of the image sensor assembly 200, the imaging system may also include one or more processors, memories, logic, displays, interfaces, optics (e.g., lenses, mirrors, beamsplitters), and/or other components as may be appropriate in various implementations. In an aspect, the data output signal on the data output line 250 may be provided to the processors (not shown) for further processing. For example, the data output signal may be an image formed of the pixel values from the unit cells of the image sensor assembly 200. The processors may perform operations such as NUC, spatial and/or temporal filtering, and/or other operations. In an aspect, the processors may perform operations to facilitate calibration of the image sensor assembly 200, such as determining correction values based on a captured infrared image and temperature data associated with at least a portion of the captured infrared image. The images (e.g., processed images) may be stored in memory (e.g., external to or local to the imaging system) and/or displayed on a display device (e.g., external to and/or integrated with the imaging system).

By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 205 may represent a pixel.

Figure 3:
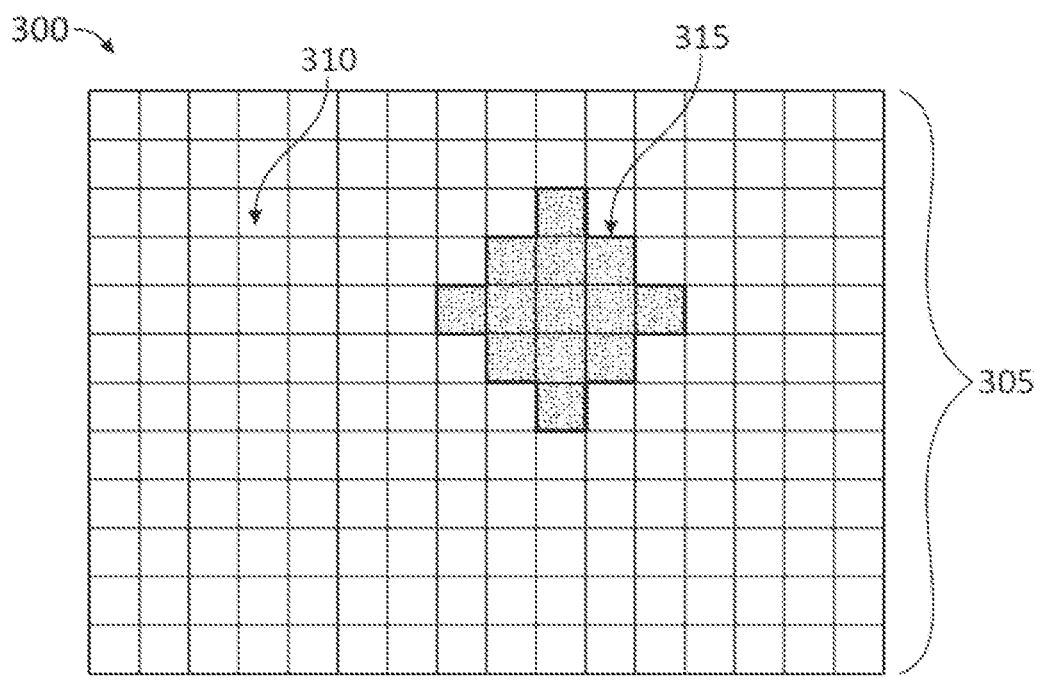
FIG. 3 illustrates an example thermal image in accordance with one or more embodiments of the present disclosure.

FIG. 3 illustrates an example thermal image 300 in accordance with one or more embodiments of the present disclosure. For explanatory purposes, in an embodiment, the thermal image 300 may be captured by the image detector circuit 175 (e.g., when implemented by an array of infrared sensors) and provided to the processing component 105. The thermal image 300 includes pixels 305 arranged in rows and columns, with each of the pixels 305 corresponding to one of the infrared sensors. Although an array of 12 rows by 16 columns is illustrated, any desired arrangement and number of pixels may be used.

The thermal image 300 corresponds to the scene 170 within the FOV 185 of the image capture component 115. A subset 315 of the pixels 305 of the thermal image 300 correspond to a portion of the scene 170 that is within the FOV 190 of the temperature sensing component 135. In this regard, the subset 315 represents an overlap in the FOVs 185 and 190. At least one pixel among the subset 315 encompasses at least a portion of the object 195. A subset 310 of the pixels 305 of the thermal image 300 correspond to a portion of the scene 170 outside the FOV 190 of the temperature sensing component 135. In this regard, the subset 310 include those pixels for which the temperature sensing component 135 does not capture temperature data.

As shown in FIG. 1, the FOV 190 of the temperature sensing component 135 encompasses the object 195. The temperature sensing component 135 may capture temperature data (e.g., a temperature in Celsius) for the pixels that form the subset 315. In this regard, the temperature sensing component 135 may capture one or more temperature values associated with the object 195. In cases that the thermal image 300 is captured by the imaging capture component 115 simultaneously and/or substantially contemporaneously with the temperature value(s) of the object 195 being captured by the temperature sensing component 135, the processing component 105 may use one or more pixels of the subset 315 that corresponds to the object 195 and one or more of the temperature values of the object 195 to determine calibration data (e.g., one or more correction values). In an aspect, the processing component 105 (and/or other component of the imaging system 100) may use relative positions of the image capture component 105 the temperature sensing component 135 to identify which pixels captured by the image capture component 105 correspond with temperature data captured by the temperature sensing component 135. Such calibration data may be applied to the thermal image 300 to adjust pixel values of the thermal image 300 to be radiometrically calibrated. In other cases, calibration of the imaging system 100 (e.g., the image detector circuit 175) may be performed when the thermal image 300 is captured by the image capture component 115 at a different time from the temperature data being captured by the temperature sensing component 135. For example, in such cases, the object 195 may be assumed/considered to not vary in temperature over time, such that a portion of the thermal image 300 (e.g., captured by the image detector circuit 175 at a certain time) may be properly correlated with the temperature data (e.g., captured by the temperature sensing component 135 before and/or after the certain time) even when the thermal image 300 and the temperature data are captured at different times.

In some embodiments, sensors of the image detector circuit 175 have array uniformity such that the calibration data (e.g., correction values) determined based on the pixel(s) of the subset 315 that corresponds to the object 195 may be applied to pixels of the subset 310 (e.g., the remaining pixels of the thermal image 300). In this regard, calibration data (e.g., correction values) determined based on at least some of the pixels of the subset 315 may be propagated to other pixels (if any) of the subset 315 and the pixels of the subset 310 regardless of whether the pixels of the subset 310 and the subset 315 are capturing image data of a reference object (e.g., a blackbody target).

Although FIGS. 1 and 3 illustrate an example in which the object 195 is entirely within both of the FOVs 185 and 190, in some cases, calibration of the imaging system 100 (e.g., the image detector circuit 175) may be performed when the object 195 is within a portion of the FOV 185 and a portion of the FOV 190. In some cases, calibration may be performed when at least a portion of the object 195 is within an overlapping portion of the FOVs 185 and 190. In some cases, calibration may be performed when the FOV 185 and the FOV 190 capture disjoint portions (e.g., no overlapping portions) of the object 195 (e.g., such as when the reference object can be considered to have a uniform temperature).

In one or more embodiments, a vehicle may include an infrared camera that can be calibrated based on image data (e.g., thermal images) captured by the infrared camera and temperature data corresponding to the image data. In some cases, the infrared camera may be part of an imaging system, such as the imaging system 100. In some aspects, the vehicle may also include a temperature sensor that captures the temperature data. The temperature sensor may have an FOV that at least partially overlaps an FOV of the infrared imager. In an embodiment, the infrared camera may be, may include, or may be a part of, the imaging capture component 115 of FIG. 1, and/or the temperature sensor may be, may include, or may be a part of, the temperature sensing component 135 of FIG. 1. Although the various embodiments are described with respect to land-based vehicles, other types of vehicles, such as aerial vehicles (e.g., manned, unmanned, or varying degrees thereof), may have an infrared camera coupled thereto that can be calibrated based on captured image data and temperature data corresponding to the image data.

In one example, a road may be used as a reference object (e.g., a blackbody target) to facilitate calibration of infrared cameras of vehicles. Asphalt that forms the road generally has a high emissivity (e.g., close to 1.0). The road may be in view of infrared cameras mounted on vehicles (e.g., autonomous vehicles) and/or used as part of and/or to provide image data to advanced driver-assistance systems (ADAS) mounted on vehicles. In some aspects, a temperature of the road may be determined and used as a reference for a thermal image captured by the infrared camera when the road is in an FOV of the infrared camera to determine calibration data. In some cases, the calibration data may be used to correct temperature offset. Temperature readings of the road can be averaged over time, or spatially, and can be used as an anchor point for infrared imagery where a road is in the FOV of the infrared camera.

FIG. 4A illustrates an example of scene capture for facilitating calibration of an infrared camera 405 of a vehicle 400 in accordance with one or more embodiments of the present disclosure. The vehicle 400 includes the infrared camera 405 and a temperature sensor 410. The infrared camera 405 may be coupled (e.g., mounted) at or around a roof of the vehicle 400 and have an FOV 415 to capture an infrared image (e.g., thermal image). The temperature sensor 410 may be coupled (e.g., mounted) at or around a grill of the vehicle 400 and have an FOV 420 to capture temperature data. In an embodiment, the infrared camera 405 may be, may include, or may be a part of, the image capture component 115 of FIG. 1, and/or the temperature sensor 410 may be, may include, or may be a part of, the temperature sensing component 135 of FIG. 1.

In FIG. 4A, the temperature sensor 410 may primarily capture temperature data associated with a road 430 and may thus be referred to as a road temperature sensor. In one example, the temperature sensor 410 is a thermopile-based temperature sensor, such as a narrow FOV (NFOV) thermopile-based temperature sensor. Other types of temperature sensors, such as non-contact temperature sensors, may be used. Although the temperature sensor 410 is shown as facing down below the vehicle 400 to determine temperature data of the road 430 (e.g., measure a temperature of the road 430), the temperature sensor 410 may have an FOV that is not directed downward.

While the vehicle 400 is stationary (e.g., at rest) and/or during navigation (e.g., in motion) of the vehicle 400, the infrared camera 405 may capture thermal images of a scene within the FOV 415 of the infrared camera 405. In some cases, the infrared camera 405 may have a fixed (e.g., non-steerable) FOV. In some cases, such as when the vehicle 400 has the infrared camera 405 and other cameras coupled to the vehicle 400, the FOV of the infrared camera 405 may stay fixed and boresighted to facilitate correlation of image data associated with the infrared camera 405 with image data associated with the other cameras. Similarly, while the vehicle 400 is stationary and/or during navigation of the vehicle 400, the temperature sensor 410 may capture temperature data within the FOV 420 of the temperature sensor 410. The FOV 420 of the temperature sensor 410 may capture temperature data of a portion of the scene captured by the infrared camera 405.

The thermal images may provide situational awareness. For example, the thermal images may be used to detect objects, pedestrians, other vehicles, and so forth. The infrared camera 405 may capture thermal images continuously, periodically, and/or in response to user command (e.g., a user presses a button that causes the infrared camera 405 to capture a thermal image). A rate at which thermal images are captured (e.g., continuously, periodically, or otherwise) may be based on application, user preferences, safety considerations (e.g., set by manufacturers, government authorities, and/or others), power considerations (e.g., less frequent thermal image capture when the infrared camera 405 is low in battery), and/or other considerations.

In some embodiments, one or more of the thermal images captured by the infrared camera 405 and the temperature data captured by the temperature sensor 410 are used to facilitate calibration of the infrared camera 405. In this regard, the road 430 may be considered a reference object (e.g., a blackbody target) for calibration. In some aspects, data of the thermal images (e.g., a portion(s) of one or more of the thermal images) and the temperature data associated with an overlapping portion 425 of the FOVs 415 and 420 of the infrared camera 405 and the temperature sensor 410 may be used to calibrate the infrared camera 405. For example, in FIG. 4A, the overlapping portion 425 may be a circle or a rectangle (e.g., depending on a shape of the FOVs 415 and 420) on the road 430. In this regard, the temperature data associated with the overlapping portion 425 may be used as a reference (e.g., a basis for comparison/analysis) for the data of the thermal images associated with the overlapping portion 425.

One or more processors included in the infrared camera 405 or otherwise coupled to the infrared camera 405 may generate calibration data (e.g., correction values) based at least on the temperature data associated with the overlapping portion 425 and the data of the thermal images associated with the overlapping portion 425. In an aspect, the processor(s) may be, may include, or may be a part of, the processing component 105 of FIG. 1. In some cases, the temperature data (e.g., temperature readings) of the road 430 can be averaged over time and/or spatially, and can be used as an anchor point for IR imagery where the road 430 is visible to the infrared camera 405. In this regard, temperature data of the road 430 as captured and represented by the infrared camera 405 in the thermal images and temperature data of the road 430 as read by the temperature sensor 410 may be cross-correlated. Such cross-correlation may be determined (e.g., continuously, periodically, upon user command, etc.) and used to adjust/correct temperature seen by the infrared camera 405 (e.g., as provided by pixel values used by the infrared camera 405 to represent temperature). In an aspect, the calibration data may be applied to thermal images for temperature correction/compensation. In some cases, such temperature correction/compensation may be performed in real time. In other embodiments, an average (e.g., temporal and/or spatial average) of a road temperature from the temperature sensor 410 may be used to facilitate calibration with and/or without an overlapping FOV between the infrared camera 405 and the temperature sensor 410.

In some aspects, during movement of the vehicle 400, the infrared camera 405 may determine whether to generate correction values based on temperature readings captured by the temperature sensor 410. Such a determination may be based on whether an object(s) (e.g., a substance) is determined to be within the FOVs 415 and 420 of the infrared camera 405 and the temperature sensor 410, respectively. In some cases, as the infrared camera 405 and the temperature sensor 410 is capturing images and temperature readings, respectively, the processor(s) may analyze the images and/or the temperature readings and determine which image(s) and/or temperature reading(s) to use for calibration/recalibration of the infrared camera 405.

As an example, in FIG. 4B, for a thermal image of a scene captured by the infrared camera 405 and corresponding temperature data of at least a portion of the scene captured by the temperature sensor 410, the processor(s) may detect presence of a puddle 435 (e.g., instead of pavement) on the road in the portion of the scene by analyzing the thermal image and determine not to generate correction terms based on the thermal image and the temperature data, since the puddle 435 is not an appropriate reference. Alternatively or in addition, the processor(s) may detect presence of the puddle 435 by analyzing the temperature readings from the temperature sensor 410. For example, a temperature reading of the puddle 435 may be different from a temperature reading of the road. In this regard, the temperature data of the puddle 435 captured by the temperature sensor 410 may be ignored (e.g., not used for calibration purposes). In general, the temperature data of the puddle 435 does not provide useful data for generating calibration data. It is noted that a puddle is provided by way of non-limiting example. Presence of other objects (e.g., layer of leaves, rodents, or generally any road debris) may be determined not to be asphalt and these objects' associated temperature readings by the temperature sensor 410 may be ignored (e.g., not used for calibration purposes).

In one or more embodiments, other reference objects (e.g., blackbody objects) may be provided to facilitate calibration of infrared cameras of vehicles. As non-limiting examples, the reference objects may include blackbody road markers and traffic cameras with built-in blackbodies (e.g., blackbody surfaces). In some aspects, the reference objects can be oriented along streets, on corners of buildings, other infrastructure, and/or other locations. These reference objects may be in view of infrared cameras mounted on vehicles (e.g., autonomous vehicles) and/or used as part of and/or to provide image data to ADAS mounted on vehicles. In some cases, the reference objects may have precisely known temperature (e.g., standardized temperature, precisely measured temperature, etc.). The temperature of the reference objects may be measured by temperature sensors coupled to the vehicles and/or the reference objects.

FIG. 5 illustrates an example of scene capture for facilitating calibration of the infrared camera 405 of the vehicle 400 in accordance with one or more embodiments of the present disclosure. A reference structure 500 includes a reference object 505 (e.g., also referred to simply as an object). The reference object 505 may be placed along a route (e.g., on a sidewalk) to facilitate calibration of the infrared camera 405. For instance, the reference object 505 may be placed to provide passing vehicles with an opportunity (e.g., a blackbody surface) to perform calibration. Calibration may be based on a thermal image of the reference object 505 (e.g., captured by the infrared camera 405) and temperature data (e.g., temperature reading) associated with the reference object 505. In one case, the reference object 505 may include a highly emissive surface. The object 505 may be referred to as a blackbody road marker. The reference structure 500 may also include an electronics component 510. The reference object 505 may be coupled to the electronics component 510. Coupling may include physical coupling and/or communicative coupling (e.g., wireless and/or wired). In this regard, although the electronics component 510 is physically coupled to the reference object 505, the electronics component 510 may be remote from the reference object 505 in some cases. Temperature data of the reference object 505 may be communicated to vehicles (e.g., using a communication unit of the electronics component 510) and/or determined/captured by a temperature sensor (e.g., the temperature sensor 410) of the vehicles as further described below.

In one example, the electronics component 510 may include temperature measurement electronics and a communication unit (e.g., an antenna) to wirelessly communicate with vehicles, such as the vehicle 400. The temperature measurement electronics may determine temperature data associated with the reference object 505 (e.g., measure the temperature of the object 505). The communication unit may communicate the temperature data to vehicles. The communication unit may communicate via a vehicle-to-everything (V2X) communication link/medium or other broadcast link/medium. In one case, the communication unit may broadcast the temperature data in messages such that the temperature data may be received by vehicles within receiving of the messages (e.g., as the vehicles pass by the reference object 505). In another case, rather than broadcasts, the communication unit may transmit the temperature data to a passing vehicle in response to a query from the passing vehicle for the temperature data. The query may be transmitted by an imaging system that includes the infrared camera 405, the vehicle 400, and/or other system coupled to the vehicle 400. Vehicles that receive the temperature data may use (or not use) the temperature data as appropriate. For example, the vehicle 400 may use the temperature data to calibrate the infrared camera 405.

In cases where the temperature data is provided by the communication unit, a temperature sensor (e.g., the temperature sensor 410) of the vehicle 400 may be optional. In other cases, the temperature sensor 410 may still be mounted on the vehicle 400. As one example, the temperature sensor 410 may capture temperature data of other reference objects (e.g., other blackbodies such as the road). As another example, the temperature sensor 410 may detect temperature data associated with the reference object 505 and verify the detected temperature data against temperature data received from the communication unit. Such verification may be performed to determine whether the temperature sensor 410, the object 505, and/or the electronics component 510 is malfunctioning. For example, a difference in temperature of the reference object 505 determined by the temperature sensor 410 and temperature provided by the communication unit may be used to determine whether the temperature sensor 410, the reference object 505, and/or the electronics component 510 need maintenance.

Alternatively or in addition to the above-examples, the reference object 505 may be temperature controlled. For example, the electronics component 510 may include a temperature control unit that maintains the reference object 505 at a known temperature (e.g., a standardized temperature, such as one set by transportation agencies). In a case that the reference object 505 is supposed to be set to a standardized temperature, the communication unit of the electronics component 510 and the temperature sensor of the vehicles may be optional. In this regard, temperature data of the reference object 505 as represented in the thermal image captured by the infrared camera 405 may be correlated with the standardized temperature of the reference object 505. In some cases, even with the reference object 505 supposedly at a standardized temperature, the electronics component 510 may determine and communicate the temperature data of the reference object 505 to the vehicles and/or the vehicles may include temperature sensors to capture temperature data of the reference object 505. For example, a difference in a temperature of the reference object 505 from the standardized temperature as determined by the temperature sensor 410 and/or temperature provided by the communication unit may be used to determine whether the temperature sensor 410, the reference object 505, and/or the electronics component 510 need maintenance.

In another example, the reference structure 500 includes only the reference object 505 (e.g., without the electronics component 510). In this case, a temperature sensor (e.g., the temperature sensor 410) of the vehicles may capture temperature data of the reference object 505. The temperature data of the reference object 505 may be correlated with a thermal image of the reference object 505 captured by infrared sensors of the vehicles.

FIG. 6 illustrates an example of scene capture for facilitating calibration of the infrared camera 405 of the vehicle 400 in accordance with one or more embodiments of the present disclosure. The description of FIG. 5 generally applies to FIG. 6, with examples of differences and other description provided herein. A reference structure 605 includes a reference object 610. The reference object 610 may be a body panel coupled to a vehicle 600 (e.g., mounted to a bumper of the vehicle 600) to facilitate calibration of other vehicles (e.g., such as the vehicle 400 behind the vehicle 600). In this regard, the vehicle 400 may also have such a body panel (not shown) coupled thereto. The reference object 610 may include a highly emissive surface. Calibration of the infrared camera 405 may be based on a thermal image of the reference object 610 captured by the infrared camera 405 and temperature data associated with the reference object 610. The reference structure 605 may also include an electronics component 615. The reference object 610 may be physically and/or communicatively coupled to the electronics component 615. Temperature data of the reference object 610 may be communicated to vehicles (e.g., using a communication unit of the electronics component 615) and/or determined/captured by a temperature sensor (e.g., the temperature sensor 410) of the vehicles as further described below.

In one example, the electronics component 615 may include temperature measurement electronics to determine temperature data of the reference object 610 and a communication unit (e.g., an antenna) to wirelessly communicate the temperature data to other vehicles, such as the vehicle 400. The communication unit may communicate (e.g., broadcast) the temperature data via vehicle-to-vehicle (V2V) networks to facilitate radiometric calibration of other vehicles. In one case, the communication unit may broadcast the temperature data in messages such that the temperature data may be received by vehicles within receiving of the messages. Vehicles that receive the temperature data may use (or not use) the temperature data as appropriate. For example, the vehicle 400 may use the temperature data to calibrate the infrared camera 405. Air path losses may be estimated using relative positions of the vehicles. The relative positions may be determined from global positioning systems or other means provided in both vehicles. In these cases where the temperature data is provided by the communication unit, a temperature sensor (e.g., the temperature sensor 410) of the vehicle 400 may be optional.

In other cases, the temperature sensor 410 may still be mounted on the vehicle 400. As one example, the temperature sensor 410 may capture temperature data of other reference objects (e.g., other blackbodies such as the road). As another example, the temperature sensor 410 may detect temperature data associated with the reference object 610 and verify the detected temperature data against temperature data received from the communication unit. Such verification may be performed to determine whether the temperature sensor 410, the reference object 610, and/or the electronics component 615 is malfunctioning. For example, a difference in temperature of the reference object 610 determined by the temperature sensor 410 and temperature provided by the communication unit may be used to determine whether the temperature sensor 410, the reference object 610, and/or the electronics component 615 need maintenance.

Alternatively or in addition to the above-examples, the reference object 610 may be temperature controlled. For example, the electronics component 615 may include a temperature control unit that maintains the reference object 610 at a known temperature (e.g., a standardized temperature, such as one set by transportation agencies and/or car manufacturers). In a case that the reference object 610 is supposed to be set to a standardized temperature, the communication unit of the electronics component 615 and the temperature sensor of the vehicles may be optional. In this regard, temperature data of the reference object 610 as represented in the thermal image captured by the infrared camera 405 may be correlated with the standardized temperature of the reference object 610. In some cases, even with the reference object 610 supposedly at a standardized temperature, the electronics component 615 may determine and communicate the temperature data of the reference object 610 to the vehicles and/or the vehicles may include temperature sensors to capture temperature data of the reference object 610. For example, a difference in a temperature of the reference object 610 from the standardized temperature as determined by the temperature sensor 410 and/or temperature provided by the communication unit may be used to determine whether the temperature sensor 410, the reference object 610, and/or the electronics component 615 need maintenance.

In another example, the reference structure 605 includes only the reference object 610 (e.g., without the electronics component 615). In this case, a temperature sensor (e.g., the temperature sensor 410) of the vehicles may capture temperature data of the reference object 610. The temperature data of the reference object 610 may be correlated with a thermal image of the reference object 610 captured by infrared sensors of the vehicles.

It is noted that, in FIGS. 4A, 4B, 5, and 6, positions of the infrared camera 405, the temperature sensor 410, the reference structure 605, and so forth are provided by way of non-limiting examples. For instance, as an alternative, the infrared camera 405 may be coupled to a different portion of the vehicle 400, such as at the grill or other location of the vehicle 400. Similarly, the temperature sensor 410 may be coupled to a different portion of the vehicle 400. A processor(s) of the vehicle 400 may have knowledge of the relative positions of the infrared camera 405 and the temperature sensor 410 to facilitate correlating captured pixels with captured temperature data.

Figure 7:
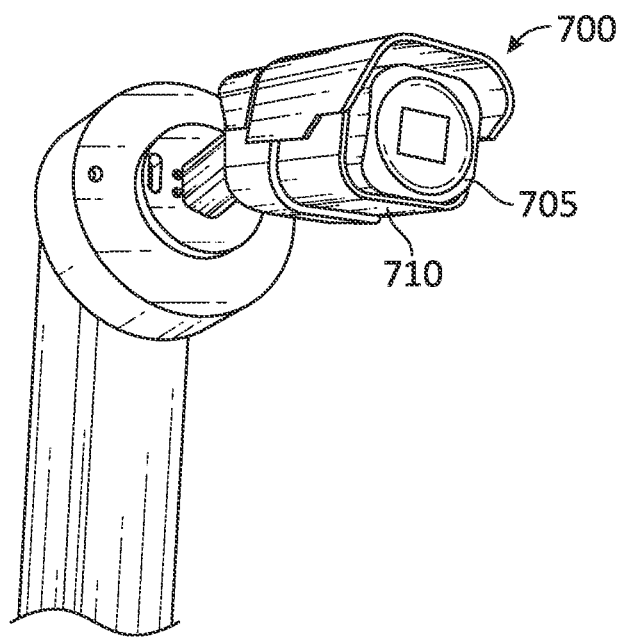
FIGS. 7, 8, and 9 illustrate examples of reference structures for facilitating calibration of infrared cameras in accordance with one or more embodiments of the present disclosure.

FIG. 7 illustrates an example reference structure 700 for facilitating calibration of infrared cameras in accordance with one or more embodiments of the present disclosure. The reference structure 700 may be mounted on a pole. The reference structure 700 includes a reference object 705. In an embodiment, the reference object 705 may be the reference object 505 of FIG. 5. The reference object 705 may be a high emissivity surface. The reference object 705 may form at least a portion of a housing of the reference structure 700. The reference structure 700 may also include an electronics component 710. The electronics component 710 may be coupled to an outer surface of the housing and/or within the housing of the reference structure 700. In one example, the reference structure 700 may be a traffic camera and/or a traffic signal control/junction box. In some cases, the reference structure 700 may communicate with vehicles (e.g., via V2X communications).

Figure 8:
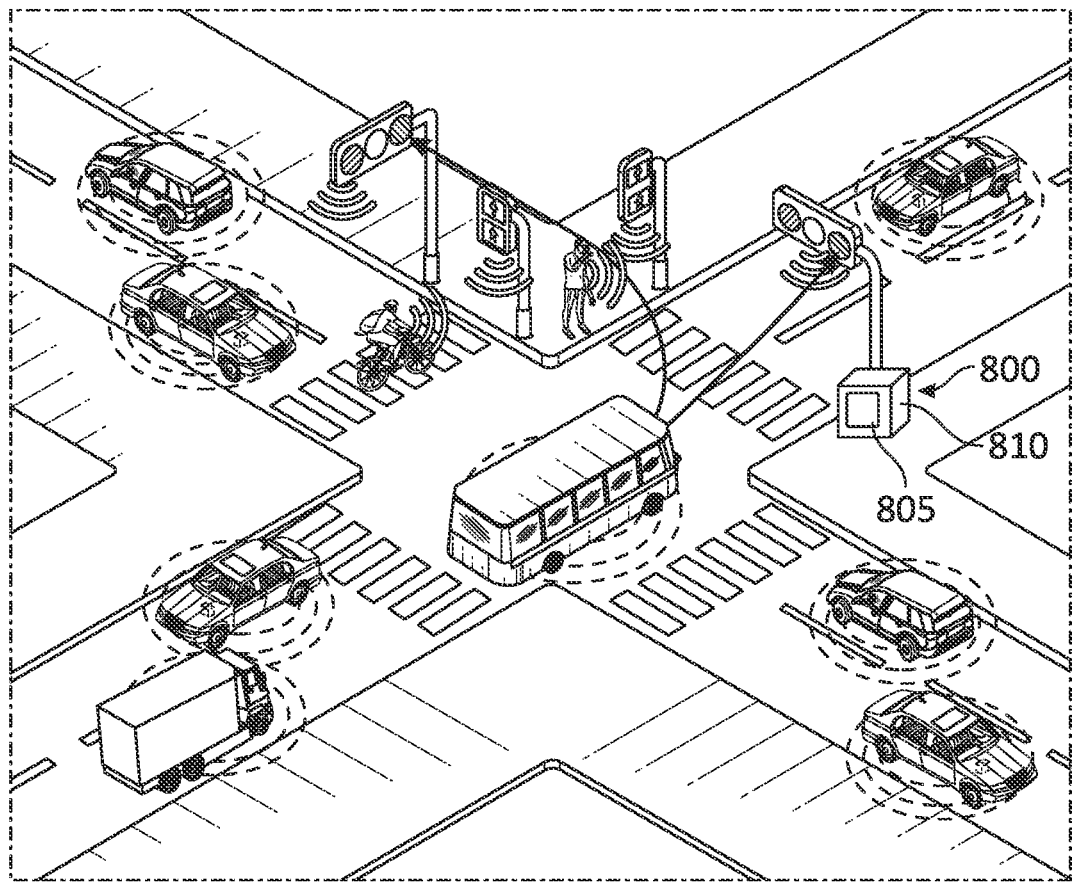

FIG. 8 illustrates an example reference structure 800 for facilitating calibration of infrared cameras in accordance with one or more embodiments of the present disclosure. The reference structure 800 includes a reference object 805. In an embodiment, the reference object 805 may be the reference object 505 of FIG. 5 or the reference object 705 of FIG. 7. The reference object 805 may be a high emissivity surface. The reference object 805 may form at least a portion of a housing of the reference structure 800. The reference structure 800 may also include an electronics component 810. The electronics component 810 may be coupled to an outer surface of the housing and/or within the housing of the reference structure 800. In one example, the reference structure 800 may be a traffic camera and/or a traffic signal control/junction box. In some cases, the electronics component 810 may communicate with vehicles (e.g., via V2X communications). It is noted that the vehicles may also communicate with each other using V2V communications, such as described with respect to FIG. 6 (e.g., the reference structure 605 of FIG. 6). In an embodiment, description pertaining to the reference structures 500, 605, and 700 FIGS. 5, 6, and 7, respectively, also apply to the reference structure 800 of FIG. 8.

Figure 9:
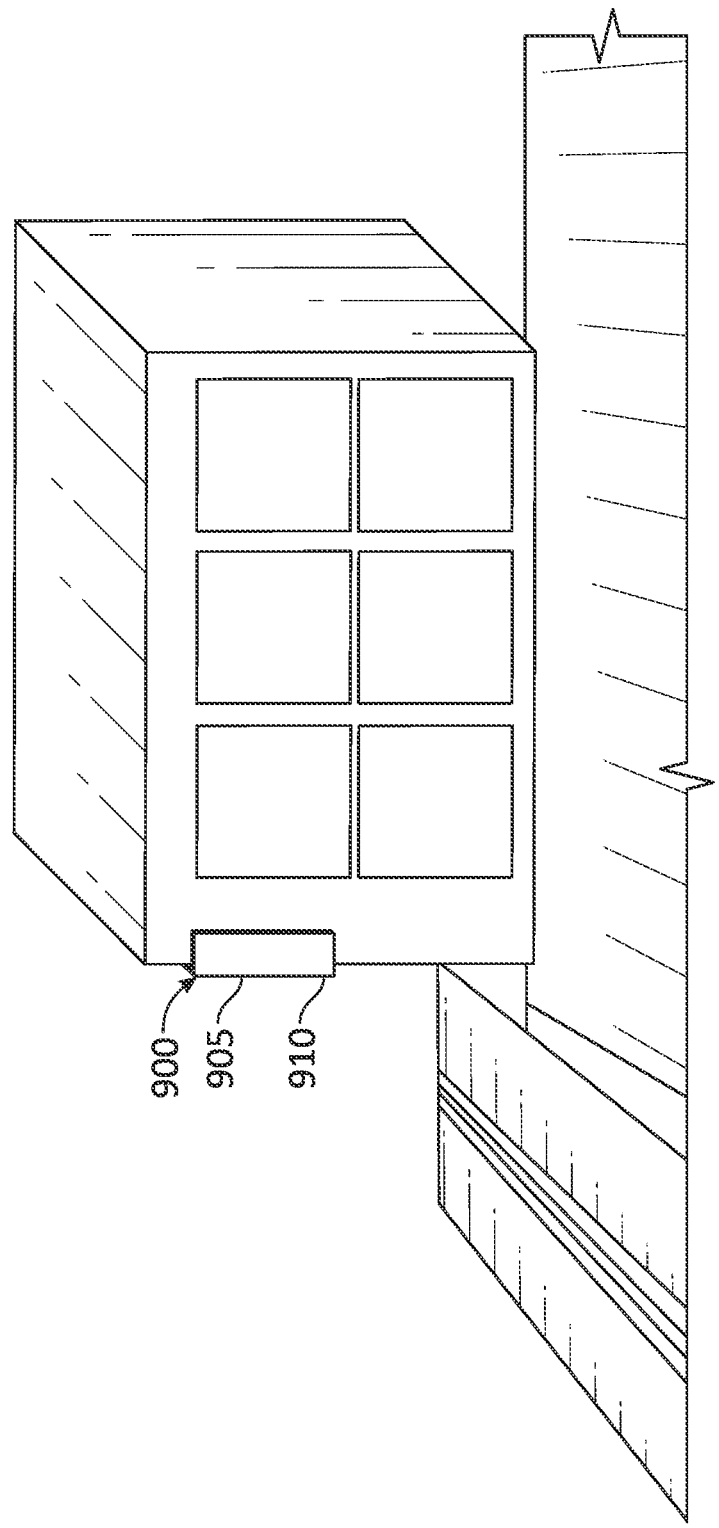

FIG. 9 illustrates an example reference structure 900 for facilitating calibration of infrared cameras in accordance with one or more embodiments of the present disclosure. The reference structure 900 includes a reference object 905. In an embodiment, the reference object 905 may be the reference object 505 of FIG. 5 or the reference object 700 of FIG. 7. The reference structure 900 is mounted to a corner of a building. The reference object 905 may be a high emissivity surface. The reference object 905 may form at least a portion of a housing of the reference structure 900. The reference structure 900 may also include an electronics component 910. The electronics component 910 may be coupled to an outer surface of the housing and/or within the housing of the reference structure 900. In some cases, the reference structure 900 may communicate with vehicles (e.g., via V2X communications).

In one or more embodiments, objects close to mounted cameras can be used as reference objects (e.g., blackbody targets). In one example, patches of a car hood with highly emissive paint may be provided in an FOV of an infrared camera to be used as blackbody targets. In some cases, although the reference objects may be out-of-focus in the thermal images, temperature data (e.g., temperature readings) of the reference objects may be used to generate calibration data. Temperature sensors may be coupled to the patches of the car hood. In another example, heated water from jet nozzles with a known temperature may be provided in an FOV of an infrared camera to be used as blackbody targets (e.g., liquid shutter). In another example, an area in front (e.g., just in front) of a vehicle's infrared camera may be heated to a known temperature and provided as a known reference point to a thermal camera(s) on the vehicle.

Figure 10:
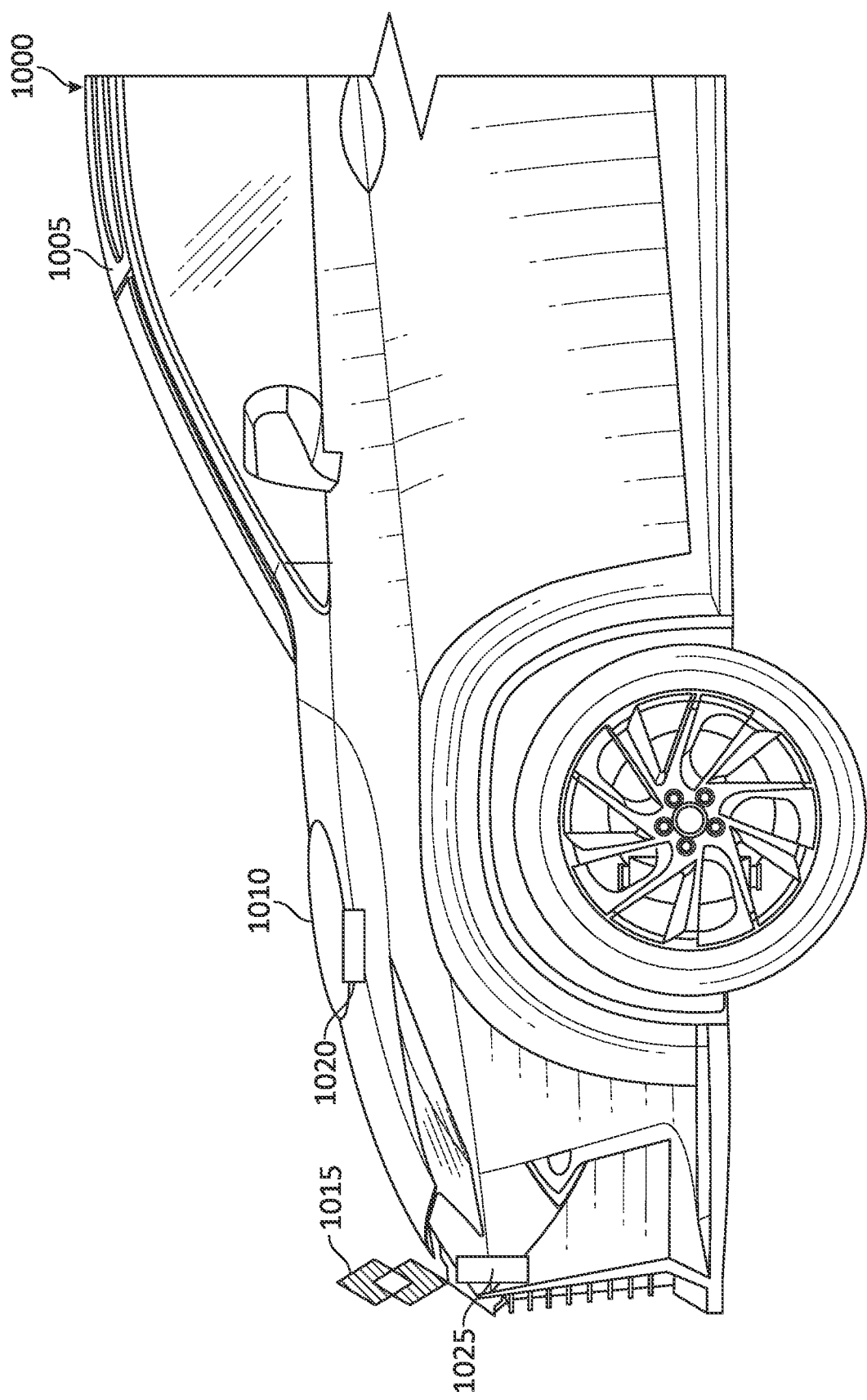
FIG. 10 illustrates examples of nearfield objects of a vehicle for facilitating calibration of an infrared camera of the vehicle in accordance with one or more embodiments of the present disclosure.

FIG. 10 illustrates examples of nearfield objects 1010 and 1015 of a vehicle 1000 for facilitating calibration of an infrared camera 1005 of the vehicle 1000 in accordance with one or more embodiments of the present disclosure. The description pertaining to the infrared camera 405 of the vehicle 400 generally applies to the infrared camera 1005 of FIG. 10. The nearfield object 1010 may be coupled to an electronics component 1020. The nearfield object 1015 may be coupled to an electronics component 1025. The nearfield objects 1010 and 1015 are mounted on the vehicle 1000. Calibration of the infrared camera 1005 may be based on a thermal image of the nearfield object 1010 and temperature data associated with the nearfield object 1010. Alternatively or in addition, calibration of the infrared camera 1005 may be based on a thermal image of the nearfield object 1015 and temperature data associated with the nearfield object 1015. The nearfield object 1010 may be a highly emissive patch on a hood or body work of the vehicle 1000. The nearfield object 1015 may be an emissive hood ornament. The electronics components 1020 and 1025 may include a temperature sensor to detect temperature data of the nearfield objects 1010 and 1015, respectively. In some cases, the electronics component 1020 and the electronics component 1025 may be coupled to a controller area network (CAN) bus or equivalent in-vehicle communications network of the vehicle 1000. In such cases, temperature data associated with the nearfield objects 1010 and 1015 may travel through the CAN bus of the vehicle 1000 or equivalent in-vehicle communications network of the vehicle 1000. It is noted that other reference objects, such as those described with respect to FIGS. 4A-9 may be used alternative to or in addition to the nearfield objects 1010 and/or 1015 to facilitate calibration of the infrared camera 1005.

Figure 11:
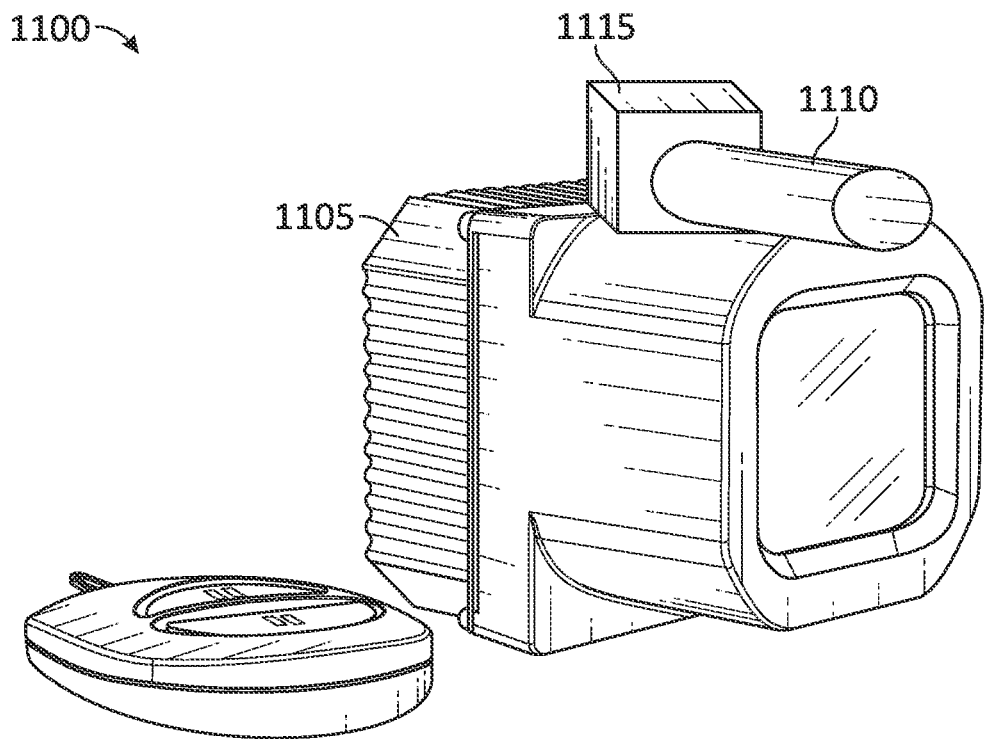
FIGS. 11 and 12 illustrate example systems for facilitating calibration of an infrared camera in accordance with one or more embodiments of the present disclosure.

FIG. 11 illustrates an example system 1100 for facilitating calibration of an infrared camera 1105 in accordance with one or more embodiments of the present disclosure. The system 1100 includes the infrared camera 1105, a local window debris water nozzle 1110, and a water temperature control/feedback unit 1115. The description pertaining to the infrared camera 405 of the vehicle 400 generally applies to the infrared camera 1105 of FIG. 11. The local window debris water nozzle 1110 may provide water on a window (e.g., a windshield) of a vehicle (e.g., the vehicle 400 or 1000) to clean the window. The water temperature control/feedback unit 1115 may control the water temperature (e.g., through controlled heating local to the infrared camera 1105) and/or measure the water temperature local to the infrared camera 1105. While the window is occluded by the water of a known temperature (e.g., measured temperature), a thermal image of the water may be captured by the infrared camera 1105. In this regard, the water provided by the local window debris water nozzle 1110 may be used as a liquid shutter. In an aspect, the infrared camera 1105 may be part of an imaging system (e.g., the imaging system 100) positioned close to the local window debris water nozzle 1110 of a vehicle. Calibration data may be generated (e.g., by a processor of the infrared camera 1105 and/or a processor remote from the infrared camera 1105) based on temperature data (e.g., known temperature) of the water and the thermal image of the water. In some cases, a thickness of a layer of water provided by the local window debris water nozzle 1110 may be sufficient such that the layer of water is impenetrable to infrared radiation coming from the scene. With the layer of water being impenetrable to the infrared radiation, the infrared camera 1105 may essentially capture only temperature data of the layer of water.

Figure 12:
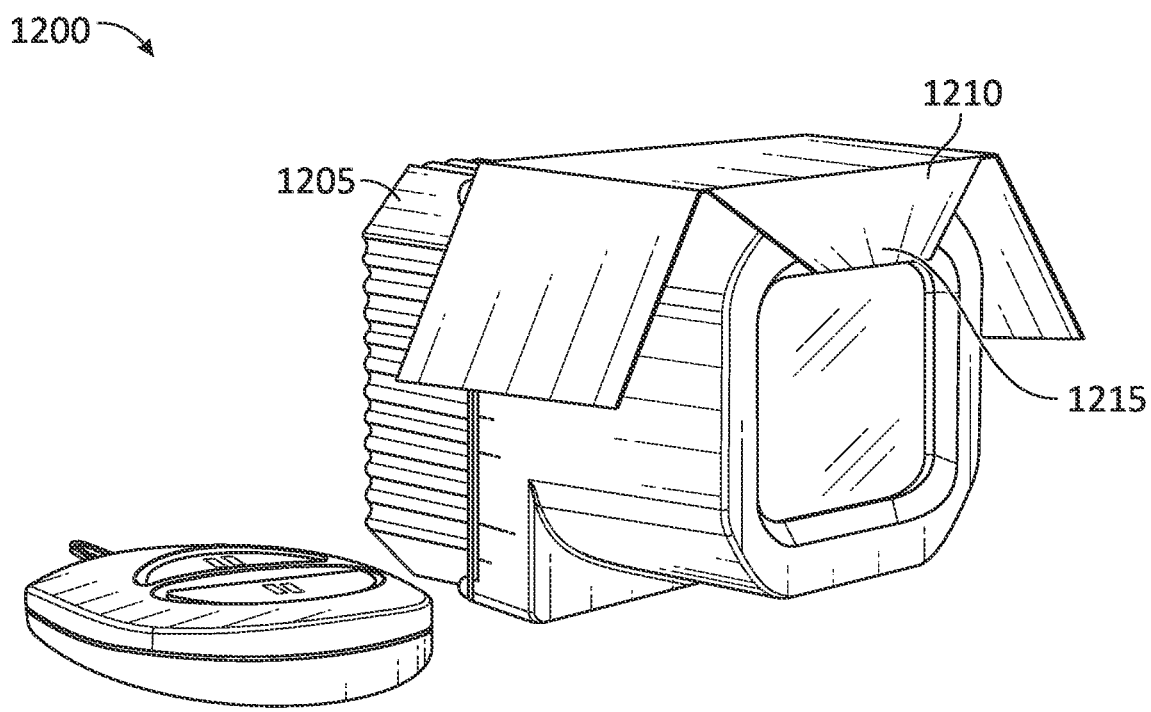

FIG. 12 illustrates an example system 1200 for facilitating calibration of an infrared camera 1205 in accordance with one or more embodiments. The system 1200 includes the infrared camera 1205 and a reference object 1210. The reference object 1210 can be integrated into a housing of the infrared camera 1205 or an object provided on top of the housing of the infrared camera 1205. In FIG. 12, the reference object 1210 is provided by a sunshield. In this regard, the reference object 1210 intentionally intersects an FOV of the infrared camera 1205. At this position, a thermal image captured of the reference object 1210 is generally out of focus. A few pixels of coverage near an edge of an array of infrared sensors of the infrared camera 1205 may be used to determine radiometric correction values that can be applied across the entire array of the infrared camera 1205. The reference object 1210 may include or may be coupled to a temperature sensor 1215 that determines and provides temperature data associated with the reference object 1210. As an example, the temperature sensor 1215 may be an embedded precision temperature sensor. In an aspect, the infrared camera 1205 may be part of an imaging system (e.g., the imaging system 100). Calibration data may be generated (e.g., by a processor of the infrared camera 1205 and/or a processor remote from the infrared camera 1205) based on temperature data of the reference object 1210 and a thermal image of the reference object 1210 captured by the infrared camera 1205.

Figure 13:
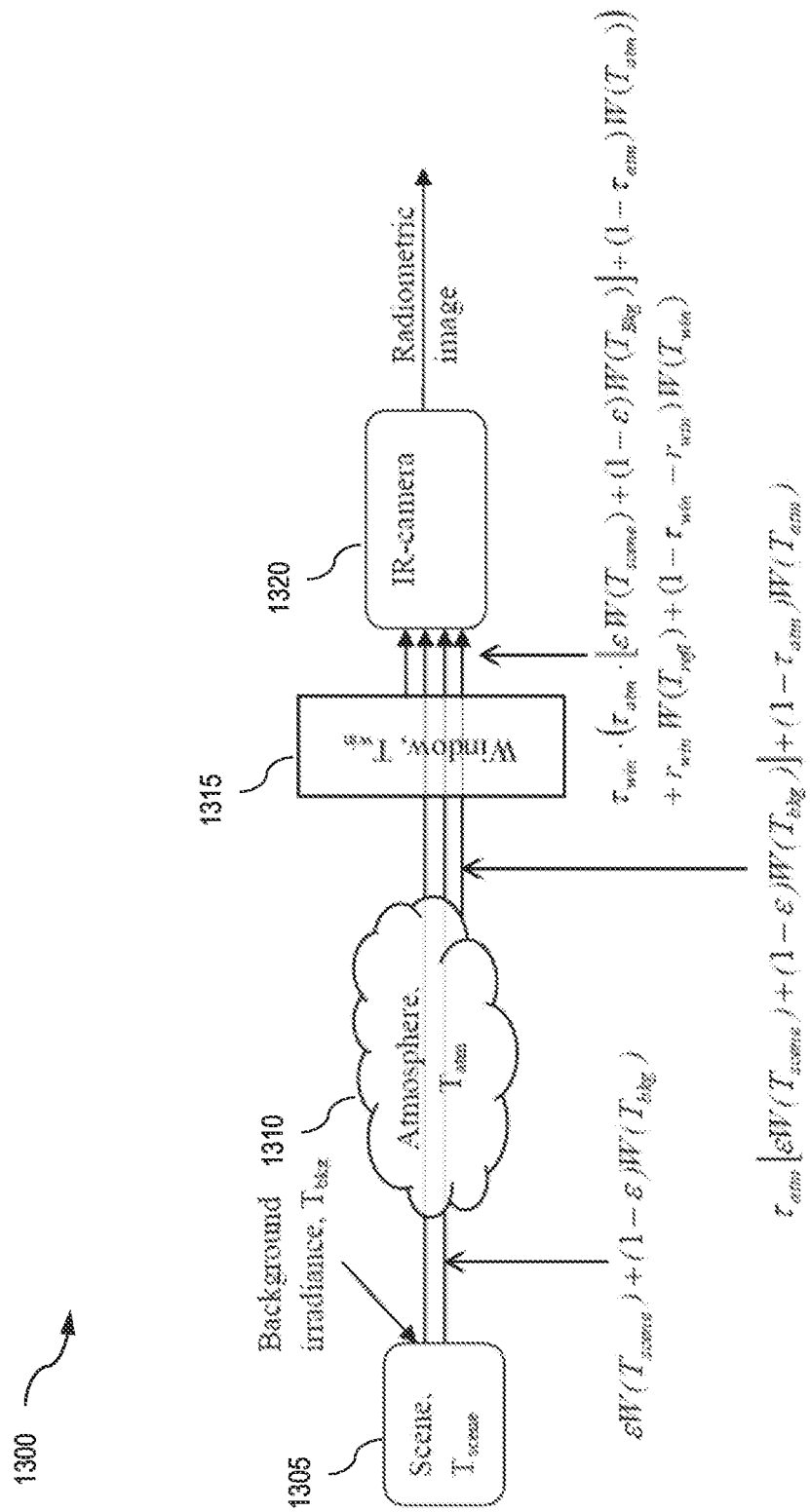
FIG. 13 illustrates an example model for temperature correction/compensation of an infrared camera in accordance with one or more embodiments of the present disclosure.

FIG. 13 illustrates an example model 1300 for temperature correction/compensation of an infrared camera 1320 in accordance with one or more embodiments of the present disclosure. The model 1300 generates a thermal image (e.g., also referred to as a radiometric image) based on a scene 1305 captured by the infrared camera 1320. The model 1300 factors in an atmosphere 1310 and a window 1315 between the scene 1305 and the infrared camera 1320. For example, the atmosphere 1310 and the window 1315 may be in front of an array of detectors (e.g., microbolometers) of the infrared camera 1320. As such, the model 1300 accounts for and/or may be adjusted to account for additional components (e.g., optical elements such as lenses and/or protective windows) provided between an imaged scene and the infrared camera 1320 to account for radiometric variations attributable to such additional components. An incident radiation onto the infrared camera 1320 may be given by:

$$S = \tau_{win}(\tau_{atm} \cdot [\varepsilon W(T_{scene}) + (1-\varepsilon) W(T_{Bkg})] + (1-\tau_{atm}) W(T_{atm}) + r_{win} W(T_{refl}) + (1-\tau_{win} r_{win}) W(T_{win})$$

Table 1 provides the notation and description used in the above equation and in FIG. 13.

TABLE 1

Notation and Description

| Notation | Description |
|---|---|
| S | Value of a digital video in counts |
| $\varepsilon$ | Emissivity of the scene |
| $\tau_{win}$ | Transmission coefficient of the window |

TABLE 1-continued

Notation and Description

| Notation | Description |
|---|---|
| $T_{win}$ | Window temperature |
| $r_{win}$ | Window reflection |
| $T_{refl}$ | Temperature reflected in the window |
| $\tau_{atm}$ | Transmission coefficient of the atmosphere between the scene and the infrared camera |
| $T_{atm}$ | Atmosphere temperature |
| $T_{bkg}$ | Background temperature (reflected by the scene) |
| $T_{scene}$ | Scene temperature |
| W(T) | Radiated flux (in units of counts) as a function of temperature of the radiating object |

In one or more embodiments, a confidence factor in radiometric accuracy may be determined. In an aspect, machine learning techniques may be leveraged to refine the radiometric accuracy. In some cases, the confidence factor may be indicative of a confidence pertaining to temperature determination, object recognition, and/or other determinations by the imaging system based on captured images (e.g., thermal images). For example, thermal images may facilitate automated driving applications, such as for automated emergency braking and/or full autonomy vehicle.

The confidence factor may be determined by analyzing various parameters. The parameters may include, by way of non-limiting examples, a camera (e.g., infrared camera) temperature, a rate of change of camera temperature, a time since a last calibration operation (e.g., a last FFC), a current NUC table, and/or a spot-meter mean. With regard to camera temperature, radiometric accuracy may be reduced when the temperature of the camera is farther away from the temperature at which the camera was calibrated. With regard to a rate of change of the camera temperature, radiometric accuracy may be reduced when the camera's temperature is rapidly changing. With regard to a time since a last calibration operation, radiometric accuracy may be reduced as time passes or the camera temperature changes relative to a prior calibration operation. To mitigate this factor, the camera may periodically perform a calibration operation, such as based on captured thermal images encompassing a reference object (e.g., a blackbody target) and associated temperature data as described herein. With regard to a NUC table, radiometric calibration may be performed in one NUC table and radiometric accuracy may be reduced with regard to other tables. With regard to a spot-meter mean, radiometric accuracy may be reduced for large temperature differences between camera temperature and scene temperature. Other factors to consider with regard to radiometric accuracy may include, for example, a rate of change of temperature from the perspective of the camera housing (e.g., its location on the vehicle) and whether the vehicle is moving or stopped. A camera housing mounted to a grill of the vehicle may receive hot exhaust gasses from a car radiator and a car engine. Whether the vehicle is moving or stopped may affect an amount of coolant, which may cause temperature changes to the camera housing.

In some embodiments, such as for automotive applications, a vehicle may use information from many sensors to determine the confidence factor in relation to radiometric accuracy. Different weights may be associated with different sensors, such as based on an environment. In some cases, the radiometric accuracy of the infrared camera may be reduced in certain known conditions and the infrared camera may use these conditions to determine the confidence factor. If the confidence factor is low, a weight on temperature measurements of objects in a scene may be reduced.

The confidence factor may be reduced due to sources other than objects in the scene. The infrared sensor may receive thermal radiation from these sources. Changes in irradiance from these sources may make an estimate their contribution difficult to determine. As such, whether or not a source is able to remain at a constant temperature may affect the confidence factor and may affect a weight associated with the source. There are known factors that reduce the accuracy of the out-of-field irradiance. External factors that can impact radiometric accuracy may be tracked by a host system and used as feedback for a radiometric infrared camera system. External factors may include weather conditions that impact atmospheric transmission, weather conditions that impact emissivity of objects in a scene, and weather conditions that result in water on a window. For instance, weather conditions that impact atmospheric transmission may include fog, rain, and humidity. Humidity may be measured and loss due to water in the atmosphere can be estimated based on measured local humidity. The confidence factor based on detected weather conditions may be estimated.

Figure 14:
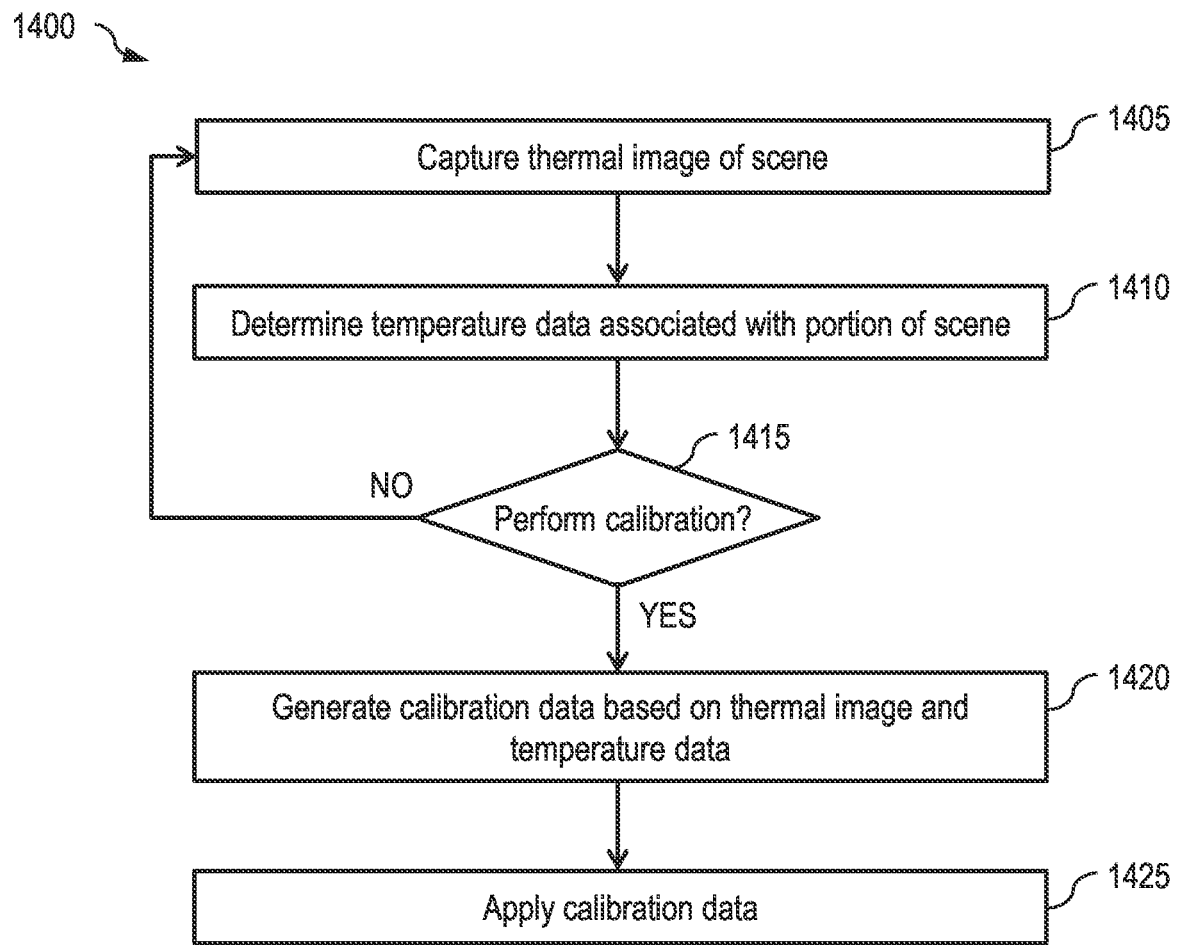
FIG. 14 illustrates a flow diagram of an example process for facilitating vehicular radiometric calibration in accordance with one or more embodiments of the present disclosure.

FIG. 14 illustrates a flow diagram of an example process 1400 for facilitating vehicular radiometric calibration in accordance with one or more embodiments of the present disclosure. For explanatory purposes, the process 1400 is primarily described herein with reference to the vehicle 400 or 1000 of FIGS. 4A-6 or 10. However, the example process 1400 is not limited the vehicle 400 or 1000. Note that one or more operations in FIG. 14 may be combined, omitted, and/or performed in a different order as desired.

At block 1405, a thermal image of a scene is captured by an array of infrared sensors of an infrared camera (e.g., the infrared camera 405). In an embodiment, the infrared camera may be, may include, or may be part of, the imaging system 100 (or portion thereof such as the image capture component 115) of FIG. 1. The infrared camera may be mounted on a vehicle (e.g., the vehicle 400 or 1000). The thermal image may include pixel values, where each pixel value is associated with an infrared sensor of the array. In the thermal image, each pixel value represents a temperature of a corresponding portion of the scene.

At block 1410, temperature data associated with at least a portion of the scene is determined. The portion of the scene may include one or more reference objects (e.g., blackbody targets). By way of non-limiting examples, a reference object may be a road; a traffic signal junction box (e.g., a housing of the box); a traffic camera (e.g., a housing of the traffic camera); a panel, an ornament, or other object on the vehicle; a panel, an ornament, or other object on another vehicle; an enclosing structure (e.g., a sunshield) in front of the infrared camera; and water sprayed on a window of the vehicle. In one aspect, the temperature data may be detected by a temperature sensor (e.g., the temperature sensor 410) mounted on the vehicle. In another aspect, alternatively or in addition, the temperature data may be received by a processor (e.g., the processing component 105). For example, the temperature data may be received from a reference structure, such as the reference structure 500 of FIG. 5.

In some embodiments, blocks 1405 and 1410 may be performed simultaneously in response to radiation received from the scene. In this regard, the temperature data determined at block 1410 may include a contemporaneous reading of the temperature of the reference object at the time the thermal image is captured at block 1405. In other embodiments, blocks 1405 and 1410 may be performed at different times, such as in cases where the reference object(s) does not vary in temperature over time.

At block 1415, a determination is made as to whether to perform calibration of the infrared camera. In some aspects, the determination may be made by a processor (e.g., the processing component 105) of the infrared camera and/or other processor. In some cases, the determination is based on content captured by the thermal image. For example, object recognition may be performed based on a shape, temperature distribution, and/or other characteristics of the pixel values of the thermal image. When the vehicle has a road temperature sensor mounted thereto, the determination may be not to perform calibration if a puddle is detected on the road. In other cases, alternatively or in addition, the determination is based on a time since a last calibration of the infrared camera. For example, if a threshold amount of time has passed (e.g., set by a manufacturer of the infrared camera, vehicle safety agencies, and/or user preference), the determination may be to perform the calibration to generate calibration data (e.g., correction values). If the threshold amount of time has not passed, the determination may be not to perform a calibration.

If the determination is not to perform calibration, the process 1400 proceeds from block 1415 to block 1405, in which a next thermal image of the scene is captured. If the determination is to perform calibration, the process 1400 proceeds from block 1415 to block 1420. At block 1420, calibration data is generated by a processor (e.g., the processing component 105) based on the thermal image and the temperature data. In some aspects, the calibration data may be based on the temperature data and pixels of the thermal image corresponding to the temperature data. For example, the temperature data and the pixels of the thermal image may be associated with a reference object (e.g., a blackbody target) in the portion of the scene. The temperature data and temperature associated with these pixels may be correlated. The calibration data may include one or more correction values. In one example, correction values may include offset values, which may be correction values that are arithmetically added to or subtracted from pixel values provided by infrared sensors. Alternatively on in addition, correction values may include gain values, which are correction values that are multiplied with pixel values provided by the infrared sensors.

At block 1425, the calibration data is applied by a processor (e.g., the processing component 105). In an aspect, the calibration data (e.g., correction value(s)) is applied to a pixel(s) of the thermal image captured at block 1405. In this aspect, correction of the thermal image occurs in real time or substantially real time. In another aspect, the calibration data is applied to a pixel(s) of a thermal image that is captured subsequent to capture of the thermal image at block 1405, such as applied to a temporally adjacent thermal image.

For calibration of the vehicle, the process 1400 may be repeated continuously, substantially continuously, periodically, upon user request, and/or at other intervals. Performing of the process 1400 allows calibration data for the infrared camera of the vehicle to be up to date. Although the process 1400 of FIG. 14 is discussed in the context of a single thermal image to be used with associated temperature data to facilitate calibration of the infrared camera that captured the single thermal image, other embodiments are contemplated. For example, multiple thermal images (e.g., captured at the same or different times) and/or multiple temperature data may be used to more precisely determine one or more pixel value correction values. For example, in some embodiments, the generated pixel value correction values may be averaged over multiple thermal images and/or multiple temperature values.

Terms such as "top", "bottom", "front", "rear", "side", "horizontal", "vertical", and the like refer to an arbitrary frame of reference, rather than to the ordinary gravitational frame of reference. Thus, such a term may extend upwardly, downwardly, diagonally, or horizontally in a gravitational frame of reference.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method comprising:
   capturing, by an array of infrared sensors mounted on a first vehicle, a first thermal image of a scene during navigation of the first vehicle and/or while the first vehicle is stationary, wherein the first thermal image comprises a plurality of pixel values, and wherein each infrared sensor of the array is associated with a respective one of the plurality of pixel values;
   transmitting a request to a reference structure for temperature data associated with a portion of the scene, wherein the temperature data is associated with a blackbody object provided by the reference structure, and wherein the blackbody object comprises at least one of a housing of a traffic signal junction box, a housing of a traffic camera, an object on the first vehicle, an object on a second vehicle, or a sunshield in front of a subset of the infrared sensors of the array;
   determining the temperature data associated with the portion of the scene, wherein the portion is associated with a subset of the plurality of pixel values; wherein the determining the temperature data comprises receiving the temperature data from the reference structure in response to the request; and
   generating a first correction value based on the first thermal image and the temperature data, wherein the first correction value is based at least on the temperature data and pixel values of the first thermal image associated with the reference structure.

2. The method of claim 1, further comprising:
   applying the first correction value to a first pixel value of the plurality of pixel values;
   determining a second correction value based on the first correction value; and
   applying the second correction value to a second pixel value of the plurality of pixel values.

3. The method of claim 1, wherein the temperature data is determined by a temperature sensor mounted on the first vehicle, the method further comprising:
   capturing, by the array, a second thermal image; and
   applying the first correction value to the second thermal image.

4. The method of claim 1, further comprising:
   identifying an object in the portion of the scene; and
   determining whether to perform calibration of the array based on the object,
   wherein the generating is based on the determining whether to perform calibration.

5. The method of claim 1, further comprising:
   spraying water on a window of the first vehicle, wherein the first thermal image and the temperature data are further associated with the water on the window; and
   applying an average of at least the first correction value and a second correction value to a first pixel value of the plurality of pixel values, wherein the first correction value is a current correction value associated with the first pixel value, and wherein the second correction value is a previous correction value associated with the first pixel value.

6. The method of claim 1, further comprising determining a weight associated with the temperature data, wherein the first correction value is further based on the weight.

7. The method of claim 1, further comprising determining a confidence factor associated with a radiometric accuracy of the array of infrared sensors, wherein the first correction value is further based on the confidence factor, wherein the confidence factor is based on at least one of a temperature associated with the array of infrared sensors, a rate of temperature change associated with the array of infrared sensors, a time since a previous calibration operation, a difference between the temperature associated with the array of infrared sensors and a temperature associated with the scene, a weather condition associated with atmospheric transmission, a weather condition associated with emissivity of objects in the scene, or a weather condition that results in water on a window in front of the array of infrared sensors.

8. The method of claim 1, further comprising:
   determining temperature data associated with an object;
   determining a first weight associated with the temperature data associated with the portion of the scene; and
   determining a second weight associated with the temperature data associated with the object,
   wherein the first correction value is further based on the first weight, the temperature data associated with the object, and the second weight.

9. A vehicle comprising:
   an array of infrared sensors configured to capture a first thermal image of a scene during navigation of the vehicle and/or while the vehicle is stationary, wherein the first thermal image comprises a plurality of pixel values, and wherein each infrared sensor of the array is associated with a respective one of the plurality of pixel values; and a processing circuit configured to:
receive temperature data associated with a portion of the scene from a reference structure, wherein the temperature data is associated with a blackbody object provided by the reference structure, and wherein the blackbody object comprises at least one of a housing of a traffic signal junction box, a housing of a traffic camera, an object on the vehicle, an object on a second vehicle, or a sunshield in front of a subset of the infrared sensors of the array; and
generate a first correction value based on the first thermal image and the temperature data associated with the portion of the scene, wherein the portion is associated with a subset of the plurality of pixel values, and wherein the first correction value is based at least on the temperature data and pixel values of the first thermal image associated with the reference structure.

10. The vehicle of claim 9, wherein:
the array of infrared sensors is further configured to capture a second thermal image; and
the processing circuit is further configured to:
apply the first correction value to the second thermal image and a first pixel value of the plurality of pixel values;
determine a second correction value based on the first correction value; and
apply the second correction value to a second pixel value of the plurality of pixel values.

11. The vehicle of claim 9, wherein:
the processing circuit is further configured to:
identify an object in the portion of the scene; and
determine whether to perform calibration of the array of infrared sensors based on the object,
the processing circuit is configured to generate the first correction value based on determining whether to perform calibration.

12. The vehicle of claim 9, further comprising a temperature sensor configured to determine the temperature data, wherein the processing circuit is further configured to apply an average of at least the first correction value and a second correction value to a first pixel value of the plurality of pixel values, wherein the first correction value is a current correction value associated with the first pixel value, and wherein the second correction value is a previous correction value associated with the first pixel value.

13. The vehicle of claim 9, wherein the processing circuit is further configured to determine a weight associated with the temperature data, wherein the first correction value is further based on the weight.

14. A vehicle comprising:
a nozzle configured to spray water on a window of the vehicle;
an array of infrared sensors configured to capture a first thermal image of a scene during navigation of the vehicle and/or while the vehicle is stationary, wherein the first thermal image comprises a plurality of pixel values, and wherein each infrared sensor of the array is associated with a respective one of the plurality of pixel values;
a processing circuit configured to generate a first correction value based on the first thermal image and temperature data associated with a portion of the scene, wherein the portion is associated with a subset of the plurality of pixel values, and wherein the first thermal image and the temperature data are associated with the water on the window.

15. The vehicle of claim 9, wherein the processing circuit is further configured to transmit a request to the reference structure for the temperature data, and wherein the temperature data is received from the reference structure in response to the request.

16. The vehicle of claim 9, wherein the processing circuit is further configured to determine a confidence factor associated with a radiometric accuracy of the array of infrared sensors, wherein the first correction value is further based on the confidence factor, and wherein the confidence factor is based on at least one of a temperature associated with the array of infrared sensors, a rate of temperature change associated with the array of infrared sensors, a time since a previous calibration operation, a difference between the temperature associated with the array of infrared sensors and a temperature associated with the scene, a weather condition associated with atmospheric transmission, a weather condition associated with emissivity of objects in the scene, or a weather condition that results in water on a window in front of the array of infrared sensors.

17. The vehicle of claim 9, wherein the processing circuit is further configured to:
determine a first weight associated with the temperature data associated with the portion of the scene; and
determine a second weight associated with temperature data associated with an object,
wherein the first correction value is further based on the first weight, the temperature data associated with the object, and the second weight.

18. The vehicle of claim 14, further comprising a temperature sensor configured to determine the temperature data, wherein the processing circuit is further configured to apply an average of at least the first correction value and a second correction value to a first pixel value of the plurality of pixel values, wherein the first correction value is a current correction value associated with the first pixel value, and wherein the second correction value is a previous correction value associated with the first pixel value.

19. The vehicle of claim 14, wherein the processing circuit is further configured to determine a confidence factor associated with a radiometric accuracy of the array of infrared sensors, wherein the first correction value is further based on the confidence factor, and wherein the confidence factor is based on at least one of a temperature associated with the array of infrared sensors, a rate of temperature change associated with the array of infrared sensors, a time since previous calibration operation, a difference between the temperature associated with the array of infrared sensors and a temperature associated with the scene, a weather condition associated with atmospheric transmission, a weather condition associated with emissivity of objects in the scene, or a weather condition that results in water on the window in front of the array of infrared sensors.

20. The vehicle of claim 14, wherein the processing circuit is further configured to:
determine a first weight associated with the temperature data associated with the portion of the scene; and
determine a second weight associated with temperature data associated with an object,
wherein the first correction value is further based on the first weight, the temperature data associated with the object, and the second weight.

* * * * *

UNITED STATES PATENT AND TRADEMARK OFFICE
CERTIFICATE OF CORRECTION

PATENT NO. : 12,166,961 B2  
APPLICATION NO. : 17/858896  
DATED : December 10, 2024  
INVENTOR(S) : Sean Tauber et al.

Page 1 of 1

It is certified that error appears in the above-identified patent and that said Letters Patent is hereby corrected as shown below:

In the Specification

In the DETAILED DESCRIPTION:
Column 12, Line 52, change "By of non-limiting examples" to --By way of non-limiting examples--.

Column 12, Lines 56, change "interface component (NICK), a mobile" to --interface component (NIC), a mobile--.

Column 12, Lines 57-58, change "Of various other types of communication components" to --or various other types of wireless communication components--.

Column 12, Lines 61-62, change "In one ease, the communication component" to --In one case, the communication component--.

Column 12, Line 65, change "interface with a Digital Subscribed Line (DSL) modem" to --interface with a Digital Subscriber Line (DSL) modem--.

Column 13, Lines 10-11, change "other appropriate types of communciation networks" to --other appropriate types of communication networks--.

Column 13, Line 11, change "networks (e.g., cellular phone network)" to --networks. In another example, the network 165 may include a wireless telecommunications network (e.g., cellular phone network)--.

Column 13, Line 16, change "such as for ex ample a Uniform" to --such as for example a Uniform--.

Column 13, Line 16, change "W(T)" to --W($T$)--.

Signed and Sealed this  
Twenty-eighth Day of January, 2025

Coke Morgan Stewart  
*Acting Director of the United States Patent and Trademark Office*